CONTROLLING ARRANGEMENTS FOR ELECTRONIC DIGITAL COMPUTING MACHINES

Filed May 17, 1951 15 Sheets-Sheet 1

INVENTORS:
F.C. WILLIAMS, T. KILBURN,
G.C. TOOTILL, & B.W. POLLARD
ATTORNEYS:
Moore and Hall INVENTORS:
F.C. WILLIAMS, T. KILBURN,
G.C. TOOTILL, & B. W. POLLARD
ATTORNEYS: Moore and Hall INVENTORS:
F.C. WILLIAMS, T. KILBURN,
G.C. TOOTILL, & B.W. POLLARD
ATTORNEYS:
Moore and Hall

CONTROLLING ARRANGEMENTS FOR ELECTRONIC DIGITAL COMPUTING MACHINES

Filed May 17, 1951

INVENTORS:
F. C. WILLIAMS, T. KILBURN,
G. C. TOOTILL, & B. W. POLLARD
ATTORNEYS:
Moore and Hall INVENTORS:
F.C. WILLIAMS, T. KILBURN,
G.C. TOOTILL, & B.W. POLLARD
ATTORNEYS:
Moore and Hall

CONTROLLING ARRANGEMENTS FOR ELECTRONIC DIGITAL COMPUTING MACHINES

Filed May 17, 1951

INVENTORS:
F.C. WILLIAMS, T. KILBURN,
G.C. TOOTILL, & B.W. POLLARD
ATTORNEYS:
Moore and Hall INVENTORS:
F.C. WILLIAMS, T. KILBURN,
G.C. TOOTILL, & B.W. POLLARD
ATTORNEYS:
Morse and Hall July 23, 1957 F. C. WILLIAMS ET AL 2,800,277

CONTROLLING ARRANGEMENTS FOR ELECTRONIC DIGITAL COMPUTING MACHINES

Filed May 17, 1951 15 Sheets-Sheet 8

INVENTORS:
F.C. WILLIAMS, T. KILBURN
G.C. TOOTILL, & B.W. POLLARD
ATTORNEYS:
Morse and Hall INVENTORS:
F.C. WILLIAMS, T. KILBURN
G.C. TOOTILL, & B.W. POLLARD
ATTORNEYS:
Moore & Hall July 23, 1957 F. C. WILLIAMS ET AL 2,800,277

CONTROLLING ARRANGEMENTS FOR ELECTRONIC DIGITAL COMPUTING MACHINES

Filed May 17, 1951 15 Sheets-Sheet 10

INVENTORS:
F. C. WILLIAMS, T. KILBURN,
G. C. TOOTILL, & B. W. POLLARD

ATTORNEYS:
Moore and Hall

INVENTORS:
F. C. WILLIAMS, T. KILBURN,
G. C. TOOTILL, & B. W. POLLARD
ATTORNEYS:
Morrison and Hail INVENTORS:
F. C. WILLIAMS, T. KILBURN,
G. C. TOOTILL, & B. W. POLLARD
ATTORNEYS:
Moore and Hall INVENTORS:
F. C. WILLIAMS, T. KILBURN,
G. C. TOOTILL, & B. W. POLLARD
ATTORNEYS:
Moore and Hall INVENTORS
FREDERIC C. WILLIAMS. TOM KILBURN.
GEOFFREY C. TOOTILL AND BRIAN W. POLLARD.
BY Stevens Davis Miller + Mosher
ATTORNEYS INVENTORS
FREDERIC C. WILLIAMS. TOM KILBURN
GEOFFREY C. TOOTILL AND BRIAN W. POLLARD.
BY Stevens, Davis, Miller & Mosher
ATTORNEYS

United States Patent Office 2,800,277

Patented July 23, 1957

2,800,277

CONTROLLING ARRANGEMENTS FOR ELECTRONIC DIGITAL COMPUTING MACHINES

Frederic Calland Williams, Timperley, Tom Kilburn, Manchester, Geoffrey Colin Tootill, Swindon, and Brian Watson Pollard, Hollinwood, England, assignors to National Research Development Corporation, London, England Application May 17, 1951, Serial No. 226,763

Claims priority, application Great Britain May 18, 1950

17 Claims. (Cl. 235—61)

This invention relates to controlling arrangements for electronic digital computing machines and is more particularly, but not exclusively, concerned with binary digital computing arrangements such as those which have been described in the following publications, which latter will, for convenience, subsequently be referred to by the allotted reference letter only.

Reference A: Proceedings of Institution of Electrical Engineers, part III, vol. 96, pages 81–100 (March 1949), by F. C. Williams et al. entitled "A Storage System for Use in Binary Digital Computing Machines."

Reference B: Nature, vol. 164, No. 4173, pages 684–687 (October 1949), by T. Kilburn entitled "The University of Manchester Universal High Speed Digital Computing Machine."

Electronic digital computing machines, such as that described in the above noted reference B, operate to perform a complete computation by executing a number of sequential computation steps or cycles, each step or cycle being under the control of a separate instruction word which is, selected usually sequentially, from a programme of instructions prepared by the person organizing the operation of the machine to perform the required computation. Such instruction words are normally loaded into a suitable memory or store within the machine and are arranged to be selected, read out and used in the appropriate order. When the computation is a long one, the number of separate instruction words required may be very large and it has already been proposed to reduce the number of separate instruction words by providing a facility for altering an instruction word once used to form another instruction word for subsequent use. A simple example of the useful employment of such an alteration facility is the possible desire to test or use each one of a series of different numbers which are located in sequential address positions within a store or memory. In such case a single instruction word can be used a number of times by successively altering the address signal portion thereof prior to each instance of use so as to select the required next number in the store.

In machines as described in the aforesaid reference use is made, for the purpose of effecting such alteration, of a so-called B-tube or store within which appropriate alteration signals can be held and fed to an arithmetical circuit associated with the control system of the machine, at the same time as the instruction word is fed thereto whereby the resultant output instruction word from such arithmetical unit is the desired combination of the two input signals.

One object of the present invention is to effect a further improvement in such type of machine by providing the B-tube or store itself with a suitable altering means whereby the modification numbers which are held in such B-tube store can themselves be altered from time to time as required before their application to the control system to effect the customary modification of the instruction word which is about to be used.

Another object of the invention is to provide an electronic digital computing machine comprising a main data store having a plurality of unique address locations therein each capable of holding a single number signal or a single instruction signal, a computation device such as an accumulator, signal transfer channels including signal controlled switching means between said main store and said computation device, a control unit providing machine operation control signals including switch-controlling signals for controlling said signal controlled switching means under the control of an instruction signal fed thereto, said control unit including an instruction signal storage device for retaining the current instruction signal therein and first stored signal modifying means interconnected with said storage device for modifying the current instruction signal while stored therein in accordance with the form of an applied instruction-modifying signal, a separate instruction-modifying signal storage means, said instruction-modifying signal storage means comprising a second stored signal-modifying device for altering an instruction modifying signal held in such storage means in accordance with the form of an applied altering signal and circuit means connecting said instruction-modifying signal storage means to said first stored signal modifying means of said instruction signal storage device of said control unit whereby any instruction modifying signal may itself be altered before application as a modifying medium in said control unit.

In order that the various features of the invention may be more readily understood one form of machine embodying such features will now be described with reference to the accompanying drawings in which:

Fig. 1 is an elementary block diagram showing the principal elements of the machine.

Figs. 2, 3 and 4 each comprise a series of waveform diagrams.

Figs. 5*a*, 5*b*; 6*a*, 6*b*; 7*a*, 7*b*; 8*a*, 8*b* and 9*a*, 9*b* are explanatory pairs of diagrams illustrating a practical form of the symbols used in the subsequent Figs. 10 to 27.

Fig. 21 is a schematic diagram of the arrangements of the B-tube while

Figure 23A:
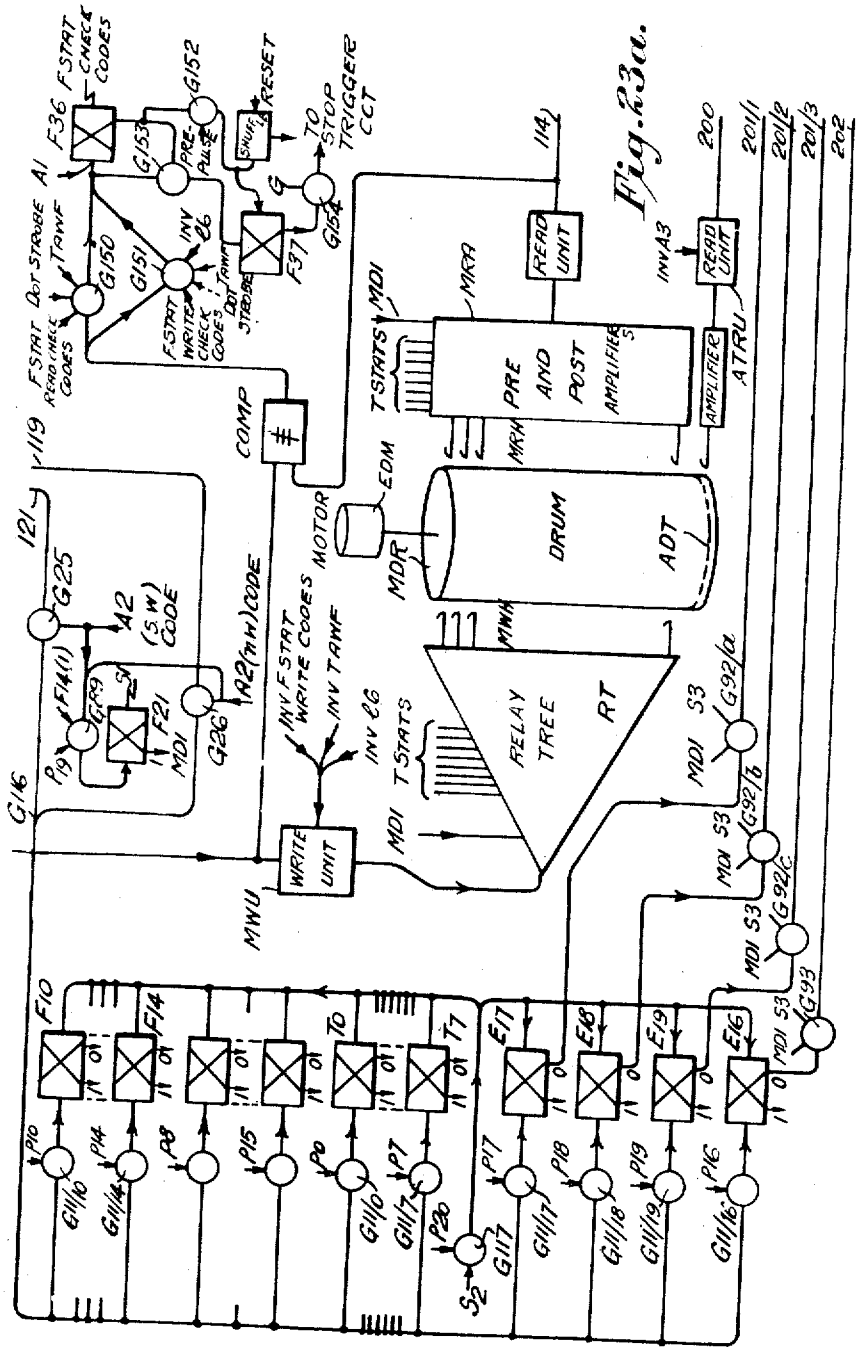
Figure 23B:
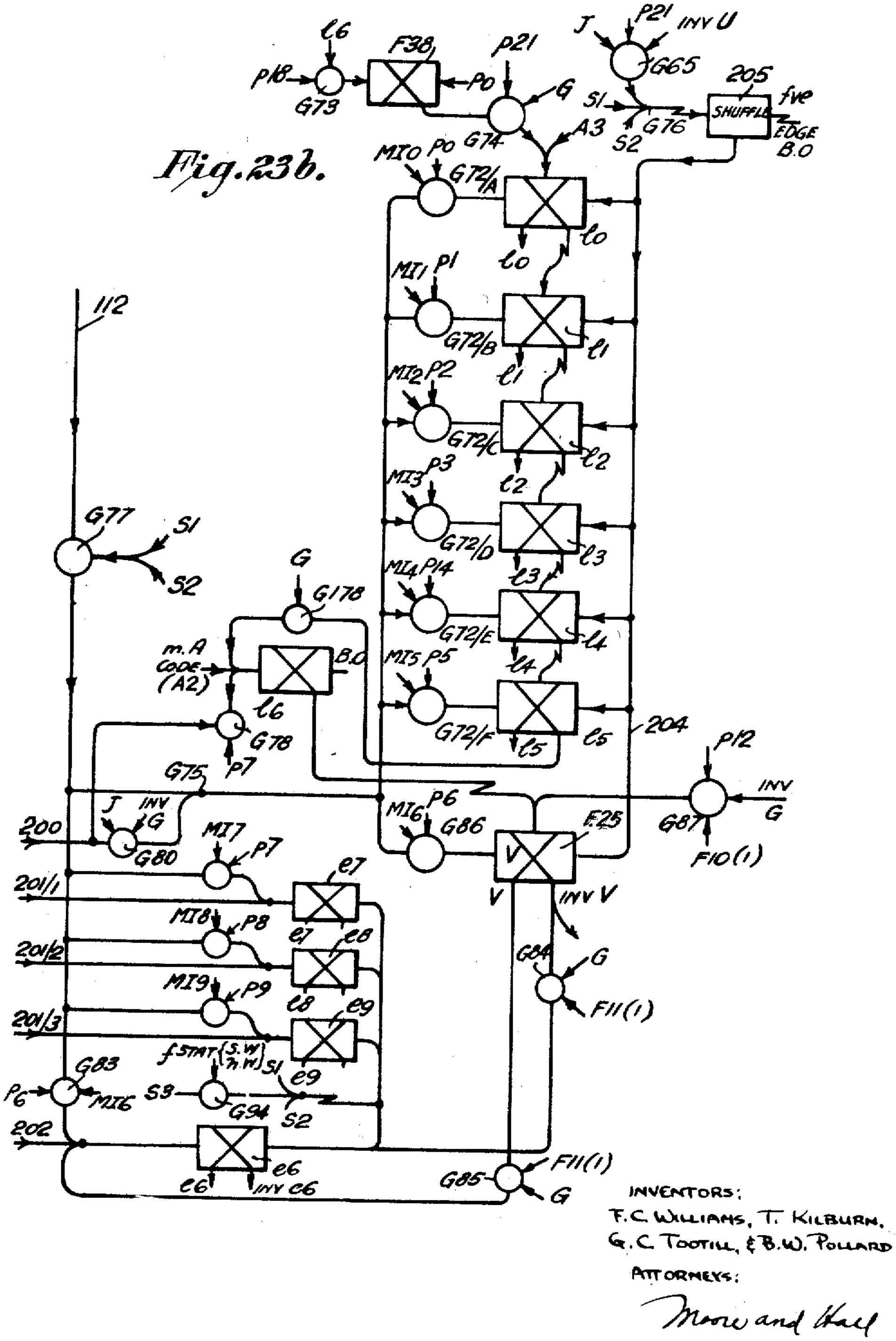

Figs. 23*a* and 23*b* form in combination a schematic diagram of the arrangements associated with the magnetic store and its controls.

Figs. 24, 25, 26 and 27 are schematic diagrams illustrating the arrangements for generating the TAWF INV TAWF, the J and INV J, the U and INV U, and the G and INV G waveforms respectively.

Figure 10:
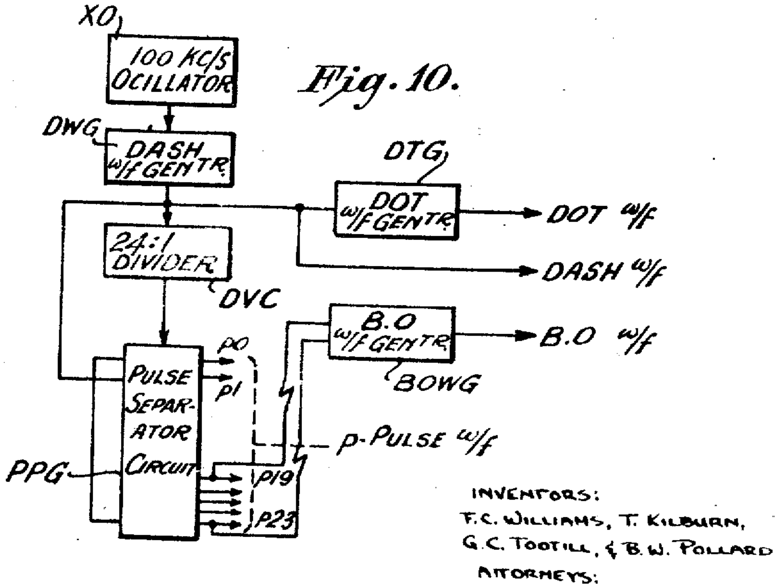
Fig. 10 is a block diagram illustrating the manner of generation of the basic waveforms of the machine.
Figure 28:
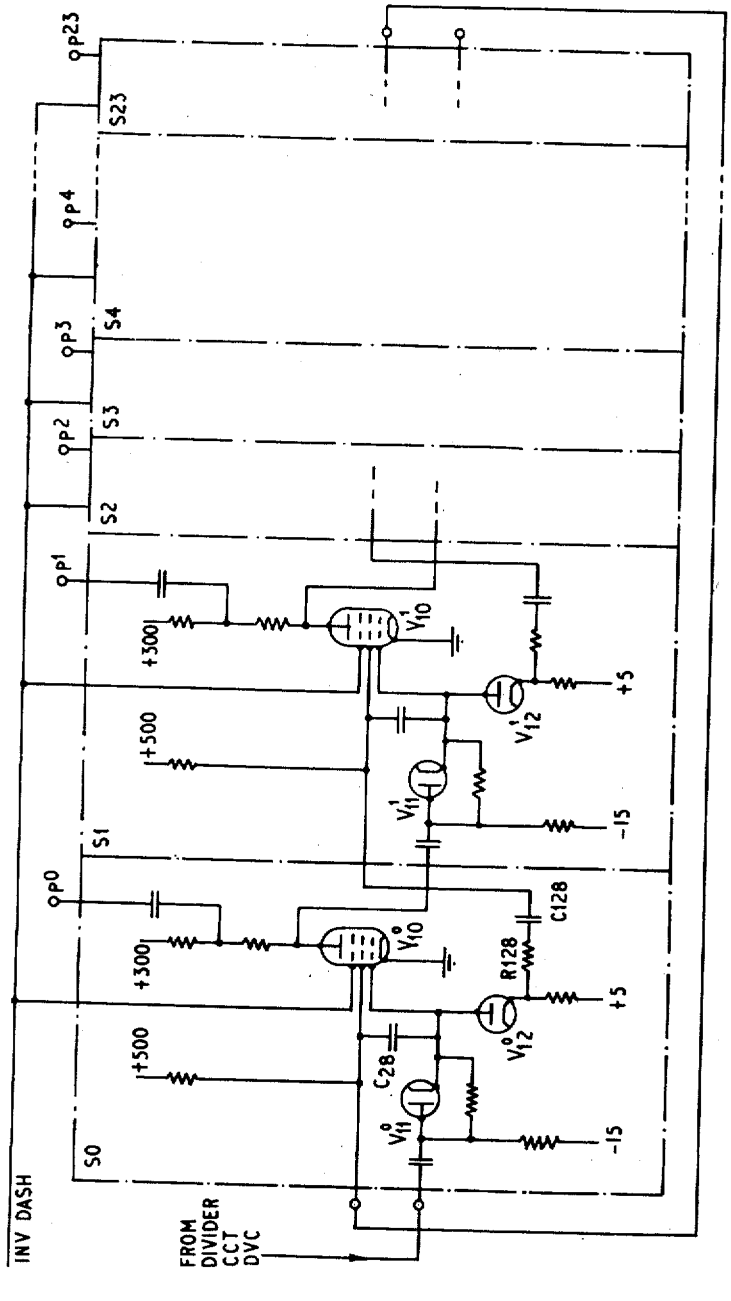

Fig. 28 is a schematic diagram of the pulse separator circuit PPG of Fig. 10.

Figures 29, 30:
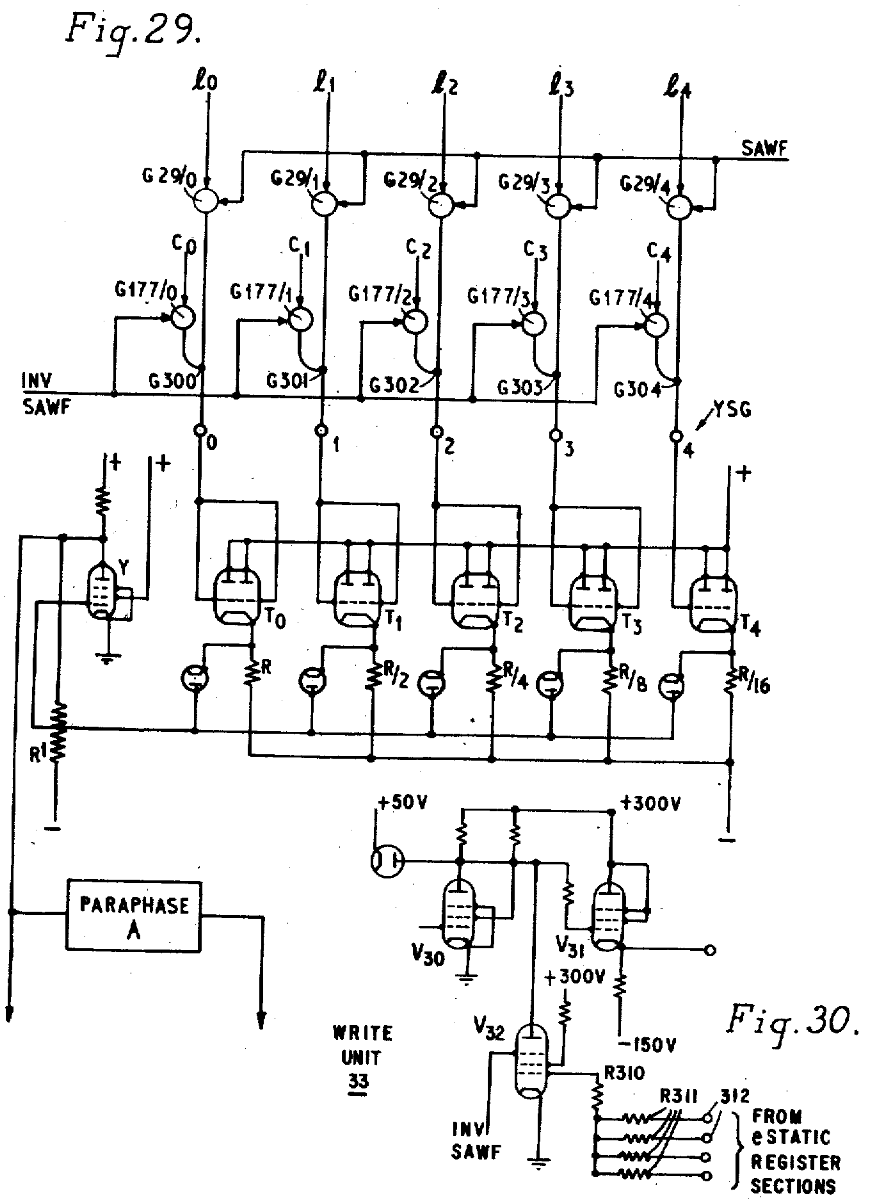

Fig. 29 is a circuit diagram illustrating the Y-scan generator YSG of the main store S.

Fig. 30 is a circuit diagram, related to Fig. 32 of the aforesaid reference A, showing the modification provided by selection of one out of a plurality of parallel connected cathode ray storage tubes.

Figure 1:
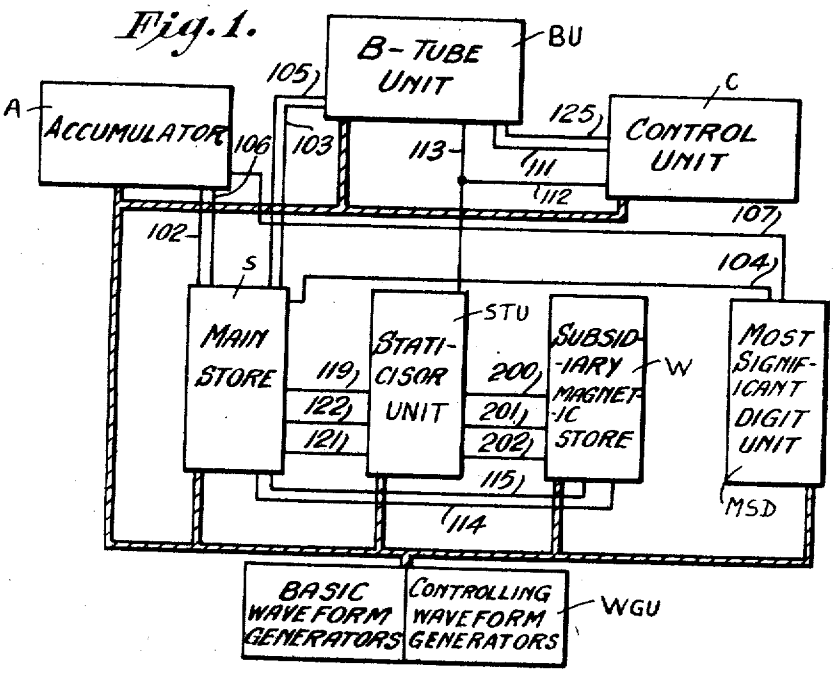

Reference will first be made to Figure 1 which shows the principal elements of an electronic binary digital computing machine of the type described in the aforesaid reference B.

In the machine the numbers concerned in the computation and the instructions for controlling the machine and defining the operation which is to be performed during any computation step are expressed in the binary code and are each represented in dynamic form in the serial mode by an electric signal comprising a train of pulses in timed relationship, the timing of any pulse of the train relative to the commencement of the time interval during which the train occurs, being a measure of the binary value of the digit represented thereby.

Figure 18:
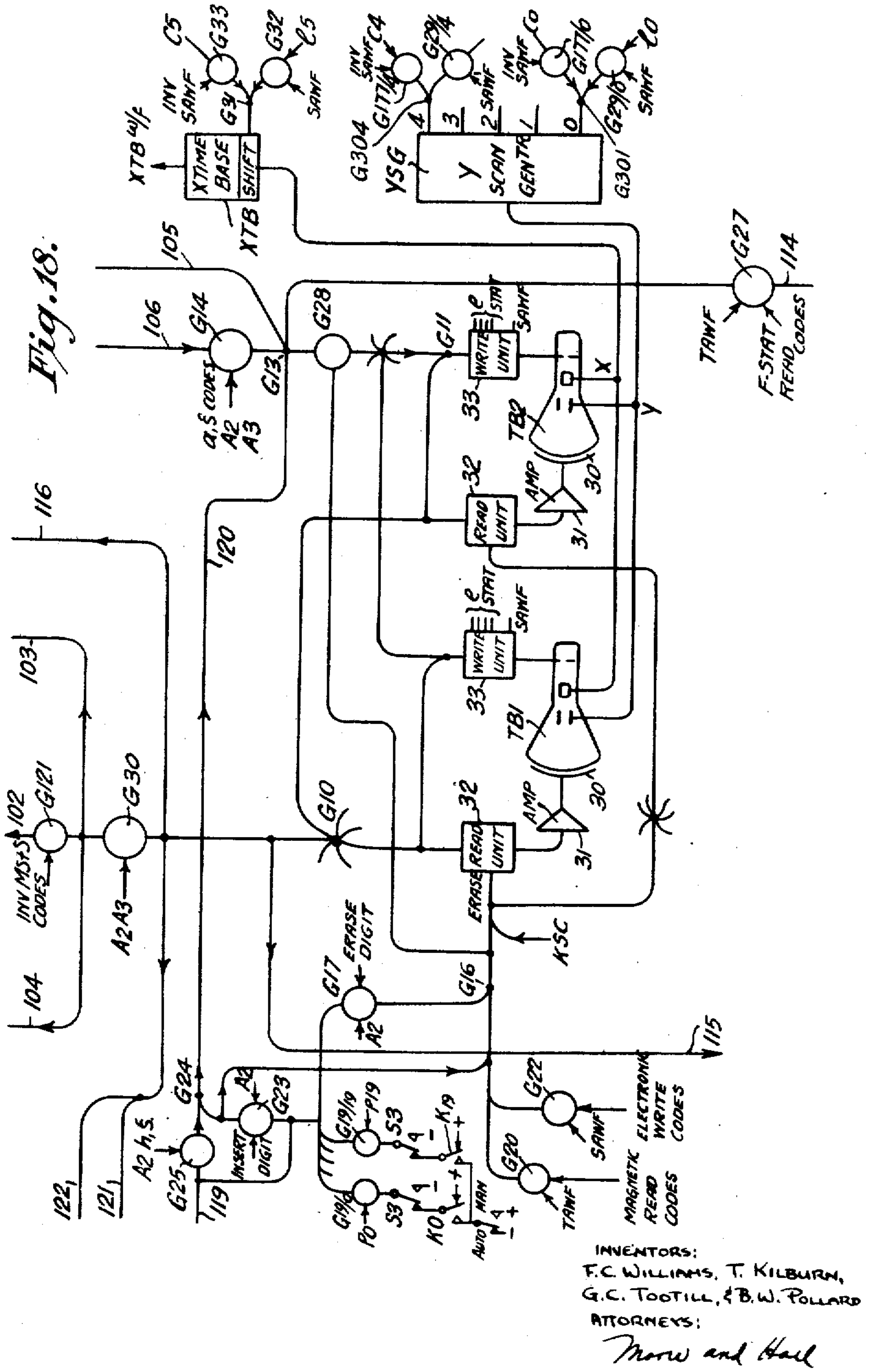
Fig. 18 is a schematic diagram of the main store arrangements.

This machine comprises a main data store S which comprises a plurality of cathode ray tube storage devices with their associated reading and writing units and other ancillary circuit elements. This main store, which is illustrated in and will be referred to later in connection with Fig. 18, provides a plurality of separate storage locations, each with a unique address, for the recording therein of the various numbers, referred to as number words and the various instructions, referred to as instruction words. The general form of the various cathode ray tube stores follows that of the device described in detail in publication A.

For controlling the operation of the machine during each of its computation steps there is provided a control unit C which includes a single cathode ray tube storage device having two separate storage addresses one of which serves to record a control instruction (CI) which is effectively a signal representing the address in the main store S at which the requisite instruction word for the ensuing operative step is located, and the other of which control unit storage addresses serves for the temporary recording of the actual instruction word, the present instruction (PI), which is being used to control the machine operation during that computation step. This control unit C is illustrated in, and will later be referred to in connection with, Fig. 20.

An accumulator A, again including a single cathode ray tube storage device with its various associated and ancillary circuit elements and provided with at least one additional arithmetical organ within its regenerative loop, for instance an adding unit, serves to record any number word supplied thereto and, subsequently, to combine any further applied number word with the first recorded number word according to the nature of the arithmetical unit employed, e. g. to add the second number to the first if the arithmetical unit is an adding unit. This accumulator A will be referred to later with reference to Fig. 19.

For the purpose of converting the dynamic serial form pulse train signals within the machine into the sustained static potentials which are usable for gate controlling and other equivalent purposes there is provided a static register or "staticisor" device STU comprising a series of separate sections each sensitive to the pulse content of a different one of the various pulse positions in a word-representing serial pulse train and, in accordance with the aforesaid pulse content, capable of providing sustained output potentials which have one or the other of two different levels. The resultant control voltages from the various static register sections are used for operating the various controlling gates of the machine. Such unit STU is illustrated in part in Fig. 23*b*, in part in Fig. 20 and in part in Fig. 21 and will be described later.

Figure 21:
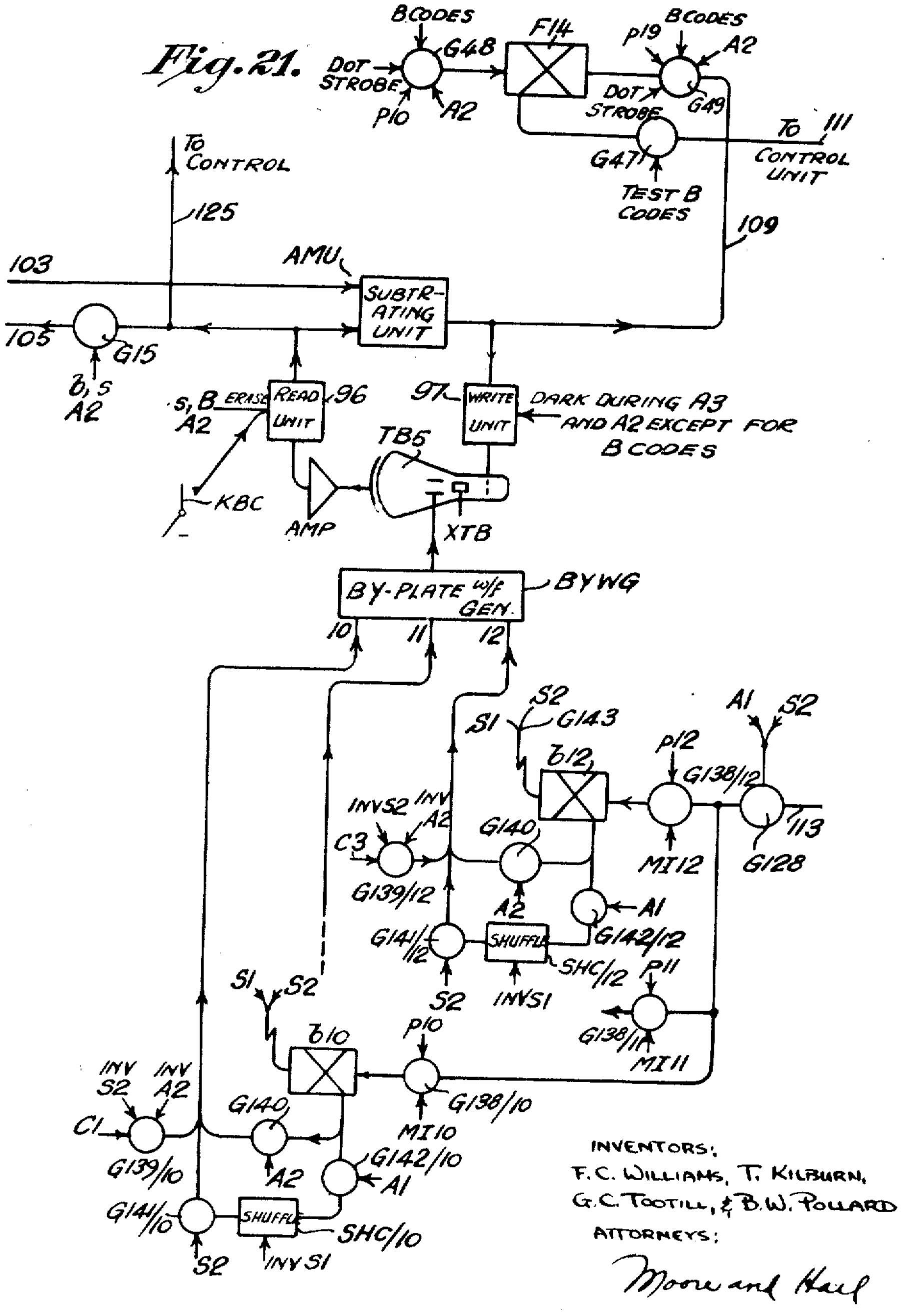

The machine also includes a B-tube unit BU which again includes a single cathode ray tube storage device with its associated and ancillary circuit elements. This storage tube provides means for altering the form of the active present instruction (PI) word in a manner which will be clearer later. Such B-tube unit is illustrated in Fig. 21.

The subsidiary magnetic store W comprises a device of the synchronised rotating magnetic drum type arranged continuously to be operated so that its signalling speed is the same as, and is synchronised in timing with, the word signals within the rest of the machine. Such subsidiary store, which is shown in Fig. 23*a*, is arranged for block transference of the contents of any recording track thereon into the main store S or, conversely, for the transference of the contents of one or more tubes of the main store S into any selected track of the subsidiary store.

The normal operation of the machine is at a rhythm of four beats or minor cycles to one bar or major operative cycle, which latter is the time taken to perform one complete step of the series of sequential steps in the desired computation. The various sequential present instructions (PI) required in the programme of operative steps for performing the required computation are arranged in addresses of sequential order in the main store S whereby the addition of unity to the control instruction (CI) standing in the control unit C during each bar automatically causes progression through each of the present instructions in turn. During the first or scan 1 (S1) beat of each bar, regeneration of the cathode ray tube storage devices is effected where necessary in a manner exactly analogous to that described in the aforesaid reference A while, at the same time, the stored control instruction number (CI) in the control unit C is increased by unity and is then fed to the static register device STU whose various sections become set up in accordance with the configuration of the digit-representing pulses of such control instruction number. During the next or action 1 (A1) beat the set up state of certain sections, known as the *l* and *e* sections, of said static register device STU become operative to adjust the address selecting means of the main store S to the location of the next required present instruction (PI) which is held in the main store while, at the same time, other sections, known as the *f* sections, of the statis register device STU serve to condition the gate circuits of the machine so as to connect the output of the main store S to the input of the control unit C so that during this beat the selected present instruction is read out from the main store S into the second or PI line of the control unit C. In the next or scan 2 (S2) beat regeneration again takes place in the various storage devices throughout the machine where necessary and simultaneously, the present instruction word previously fed into the control unit C is fed out therefrom to the static register device STU whereby the various sections of the latter are re-adjusted to conform to the digit configuration of the PI word. During the fourth or action 2 (A2) beat the altered configuration of the sections of the static register device STU again become effective upon the address selecting means of the main store S and upon the various gate circuits throughout the machine so as to make the main store S operative at the required address location, e. g. that of a required number word, and to condition the various gate circuits to interconnect the main store S with some other element of the machine in accordance with the type of operation which is required to be performed and which is being demanded by the present instruction. For example if the instruction contained a certain combination of *f* digits, i. e. those effective upon the static register sections which control the gate circuits, which is indicative of an operation to transfer the contents of the selected address in the main store S to the accumulator A then the gate circuits of the machine would be so controlled that a transfer path is made available from the output of the main store S to the input of the accumulator A. This address selecting and gate control operation is effected instantaneously at the beginning of the beat and during the beat itself the required operation takes place, for instance, the number selected in the main store S is read into the selected destination of the accumulator A. Simultaneously by the normal action of the accumulator A such number would be added or otherwise combined with any previous number content of the acumulator whereby, at the end of the beat A2 the accumulator A holds a number representing the required combination of the original number and the last selected number. By suitable arrangement of the various present instructions to form a "programme" so a continuous series of mathematical operations may be performed, one in each bar, to perform the required computation.

The operation rhythm of the machine, that is to say the timing of the various pulse trains and of the various minor cycles or beats and major cycles or bars and other operations which take place within such defined beat and bar periods is effected by means of a plurality of electric waveforms which are generated within means shown collectively in Figure 1 as the waveform generating unit WGU. The nature of these various waveforms and their manner of generation will be described in detail later.

The machine also includes a special unit MSD which is used for effecting sideways addition of the "1" digits of, and for determining the position of the most significant "1" digit of, any number-representing signal train which is applied thereto. This unit will be described in detail later in connection with Fig. 22.

The various steps of the computation, as defined by a programme of instructions compiled by the person using the machine, are worked through progressively. It is probable, in the case of a long computation, that the storage capacity of the main store S will be insufficient to hold all of the various numbers and instructions required and it is consequently necessary to make use of the enhanced capacity of the subsidiary store W. Since the latter does not have the facility for immediate access to any item therein it is not convenient to arrange this store W for direct interworking with the various other machine elements already described. Instead means are provided for transferring blocks of information, for instance equal to the capacity of one storage unit of the main store S to or from the latter from or to the subsidiary store. To avoid any break in the automatic running of the machine such transfers are arranged to take place upon the presentation to the control unit C of an appropriate Present Instruction.

The normal four-beats-to-one-bar rhythm mentioned above may be inadequate to deal with certain operations. Arrangements are accordingly provided for extending the operative bar, when necessary, to one of 5 or even 7 beats. During transfers to or from the magnetic or subsidiary store such four, five or seven beat-to-the-bar rhythm is inconvenient in view of the time which is absorbed and instead the transfer of one information item is arranged to take place in each of a large number of consecutive beats which form a bar of much extended length. The control of the machine rhythm with these variable length bars is a function of the waveforms provided by the generator unit WGU.

Figure 2:
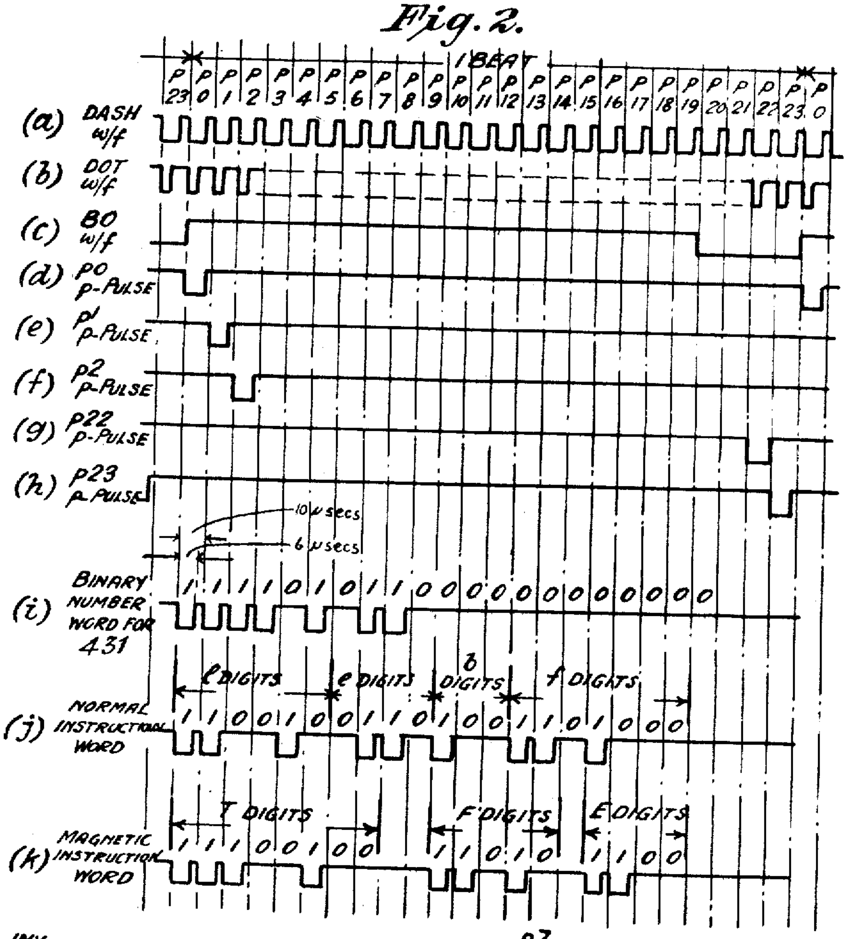

The basic word length of this machine is one of 20 digits, the "0" or "1" significance of any digit of a number being indicated respectively by the absence or presence of a negative-going pulse as shown in diagram (*i*) Fig. 2, which illustrates the form of the signal pulse train expressing in dynamic form the binary number 11110101100000000000 (reading from left to right in ascending order of binary significance) i. e. 431. Each digit pulse is of 6 microseconds' duration out of a total digit interval time of 10 microseconds' duration while the total length of each beat period, i. e. one capable of handling one 20 digit number is 240 microseconds, the remaining 40 microseconds, equal to four further digit periods, being required for the Blackout period during which the scanning beams of the various cathode-ray-tube storage devices are executing their flyback movement.

The instruction words, used for controlling the machine operation, are of similar form to the number words being also of 20 digits length and expressed, in dynamic form by a signal pulse train as shown in diagram (*j*) Fig. 2, the "0" or "1" significance of any digit thereof being again indicated by the absence or presence of a negative-going pulse. Such number and instruction words are accordingly indistinguishable individually so far as storage, conversion and handling are concerned. Different groups of the 20 digit positions of an instruction word are allocated to the control of different parts of the machine. Thus as shown in diagram (*j*) Fig. 2, the first six digits, known as the *l* digits serve to control the selection of any one of 64 different address locations in any one storage tube, the next four digits, known as the *e* digits, serve to control the selection of one out of 16 different storage tubes in which the address selection shall be effective, the next three digits, known as the *b* digits, control the selection of one out of 8 available storage locations of the B-tube while the remaining seven digits, known as the *f* or function digits, provide a total of 128 different combinations for controlling the setting up of gate controlling and like potentials for determining the type of operation, routing and so on within the machine.

The translation of the various pulse combinations in each group into static controlling potentials is effected by static register elements each consisting of a two-stable-state trigger circuit which is triggered into their "on" or set condition by the existence of a "1" representing pulse at a particular digit position of the applied instruction word signal train or left untriggered or "off" in the absence of a pulse at that position. Since each trigger circuit can provide at least two oppositely phased output potentials, a wide variety of control is rendered available. Such static register arrangements are described in detail later with reference to Figs. 20, 21 and 23(*b*).

The static controlling potentials available from the various static register sections for different combinations of function digits are combined to form what are hereinafter referred to as code control signals derived from code control circuits of which an example is given in publication B and which comprise a suitable And gate whose various inputs are supplied from selected *f* static register sections so that all of such inputs are energised to provide a code control signal output from the gate only when all of the appropriate *f* digit signals are applied to the static register sections.

Throughout the accompanying drawings, rather than apply the actual series of code digits to each of the gate input leads which are supplied with the related code control waveforms, use is made instead of a descriptive labelling indicative of the type of operation which the particular code signal produces. Thus, the label *a*,S Codes, A2, A3, shown applied to gate G14 in Fig. 18 indicates that the gate is supplied with an opening potential on that control lead during an A2 and an A3 beat when the instruction word set up on the static register unit STU is one calling for a transfer from the accumulator (symbolised by the lower case letter *a*) to the main store S (symbolised by the upper case letter S). In such symbols the starting point of the transfer is indicated by lower case letters and the destination by upper case letters. As already stated, 128 different combinaons of the function static register sections are available or providing different code signals. Other examples on he drawings are $h$,S, shown applied gate G5, Fig. 18, meaning Hand Input switches to the Main Store, $s$,C, hown applied to gate G57, meaning Main Store to Control, B Codes, meaning any code signal calling for use of the B-tube of Fig. 21, M,S Codes, meaning any code ignal calling for operation involving the Most-Significant Digit unit MSD, $s$,W, meaning Main Store to Magnetic Store and $h$,W meaning Hand Input switches to Magnetic Store.

The form and manner of operation of certain of the above described elements will now be dealt with in greater detail with particular reference to Figs. 10 to 27 of the drawings. In these figures the majority of the parts are indicated by schematic symbols and the significance of these will first be briefly referred to with the aid of Figs. 5 to 9.

Figure 4:
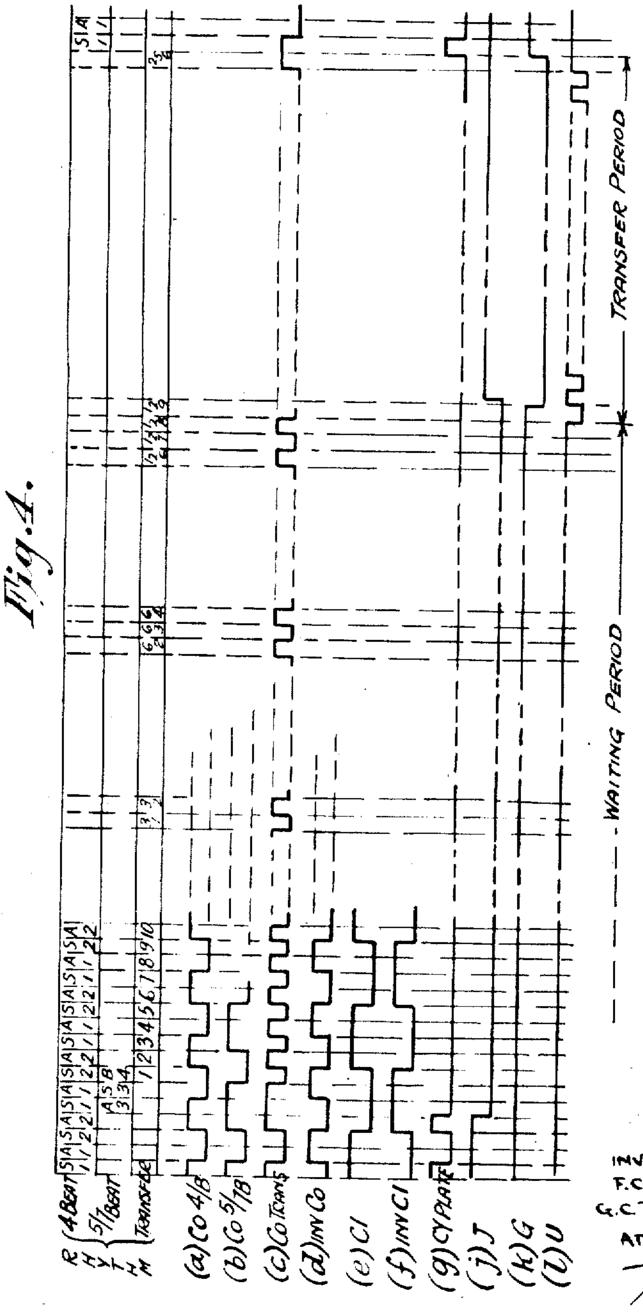
Figures 5A, 5B, 6A, 6B, 7A, 7B, 8A, 8B, 9A, 9B:
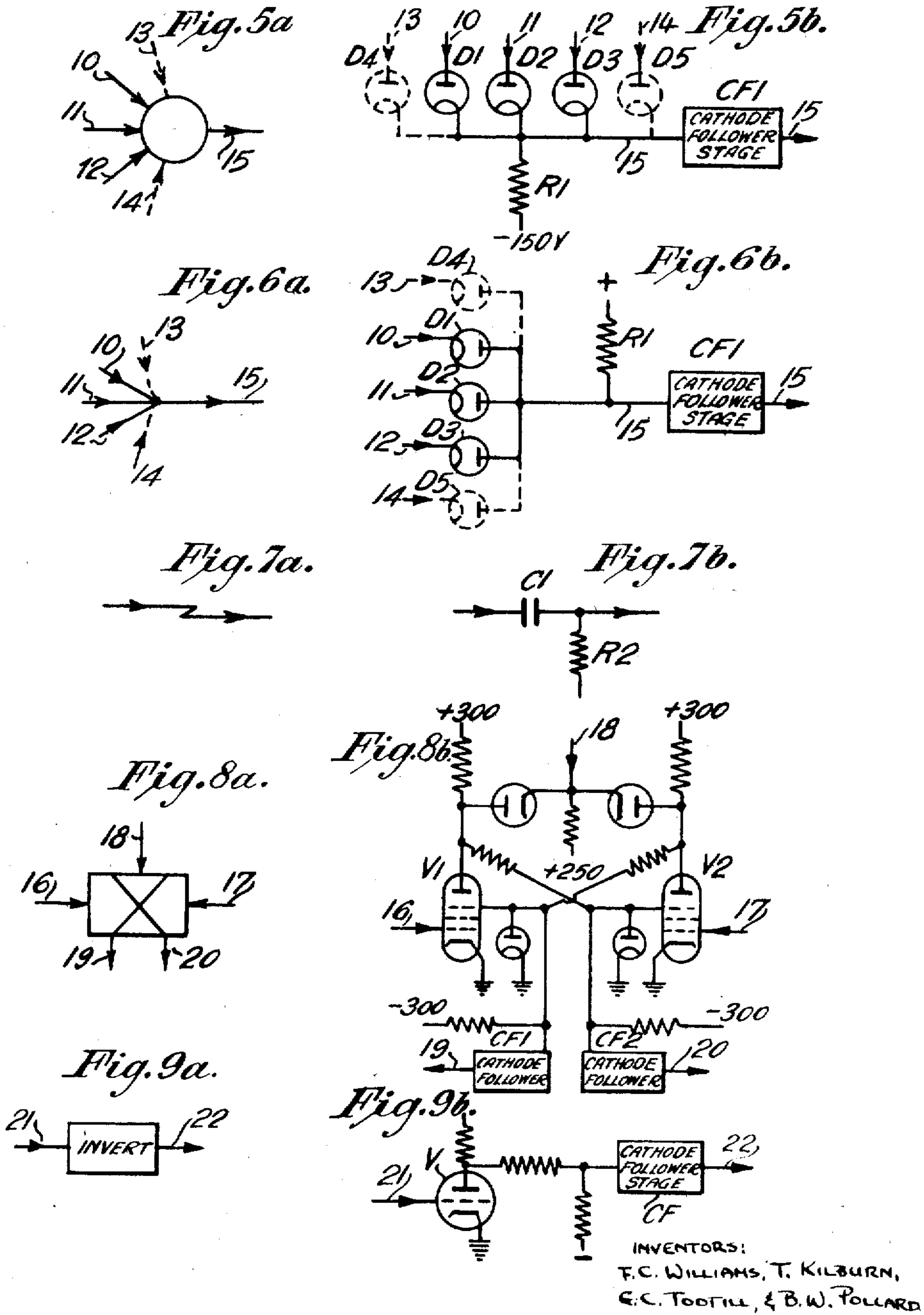

The symbol shown in Fig. 5$a$ denotes what is known in the computer art as an "And" gate requiring the simultaneous presence of two or more appropriate voltages to provide any usable output from the device. Fig. 5$b$ shows one example of a suitable circuit as employed in the present invention and in which each of the respective input controlling potentials are separately applied by leads 10, 11, 12 to the respective anodes of diodes D1, D2, D3 whose cathodes are connected in parallel to an output lead 15 and to one end of a load resistance R1 whose opposite end is connected to a source of negative potential. The output lead 10 is preferably connected to subsequent apparatus by way of a cathode-follower stage CF1. In the operation of such a gate device, an output on the lead 15 is provided only when all of the separate input leads 10, 11, 12 are supplied simultaneously with a suitable negative voltage. Within the present machine, the majority of the controlling waveforms except those which are INV, i. e. (inverse or antiphase) versions of a main waveform have a resting level of about earth potential and an active level which is appreciably negative with respect to earth as may be seen from the various waveform diagrams of Figs. 2, 3 and 4. Such inverse waveforms, indicated in the drawings by the prefix INV have a resting level which is appreciably negative with respect to earth and an active level of about earth potential. Thus the waveform S1 of Fig. 3($b$) has a resting level of earth potential and is negative during each S1 beat whereas the INV S1 waveform of Fig. 3($c$) has a negative resting level and is at earth potential only during beat S1. In consequence, a gate such as that of Fig. 5, will not be opened except when each of the applied waveforms, denoted in Figs. 10 to 27 by the added legends, is at its acting or negative level at the same time instant. Such a gate may be extended to deal with any desired number of controlling inputs by the addition of further diodes, such as shown in dotted lines at D3 and D4 with their input leads 13 and 14.

The symbol shown in Fig. 6$a$ represents that known in the art as an "Or" gate or buffer circuit in which any input signal occurring on the leads 10, 11, 12 is transmitted to the output lead 15 regardless of the condition of the other leads at the same time. A typical circuit example of such an "Or" gate is shown in Fig. 6$b$ and wherein the application of a suitable negative potential to any of the input leads 10, 11, 12, 13 or 14 will open the gate and provide a similar negative-going output on lead 15. While so opened, the application of a similar negative potential on one or more of the other input leads has substantially no effect on the output while the presence of a resting or earth potential of one or all of the remaining input leads likewise has no effect upon the output.

The symbol shown at Fig. 7$a$ indicates the inclusion in the circuit concerned of a differentiating network as indicated, for example, in Fig. 7$b$ comprising a series condenser C1 and a resistance R2.

The symbol shown at Fig. 8$a$ indicates an electronic trigger circuit having two stable states, e. g. a circuit of the so-called "Eccles-Jordan" type as illustrated in Fig. 8$b$.

In the symbol of Fig. 8$a$, when separate triggering into each of the two alternative states is required, the triggering input to turn the circuit from its resting or "off" state to its active or "on" state is applied on the left-hand lead 16 and resetting back to its original state is by a resetting input on the right hand lead 17. When reversal of state by alternate trigger inputs on a common lead is required, such common trigger input is denoted by the central lead 18. With the previously described waveform voltage requirements of the present machine the output on the left hand lead 19 is regarded as being at resting level when the trigger circuit is "off" and at active level when the circuit is triggered or "on." The output on the opposite lead 20 is in antiphase relationship. The practical circuit shown in Fig. 8$b$ comprises two cross coupled thermionic valves V1, V2 each having D. C. coupling paths to provide a circuit with two stable states which can be triggered from one condition to the other by way of any pulse delivered on a common pulsing lead 18 or triggered by an input pulse on lead 16 and reset by a pulse on lead 17. As in the embodiments of Figs. 5 and 6 the outputs are delivered through cathode follower stages CF1, CF2.

The symbol shown at Fig. 9$a$ represents a phase inverter which provides for the substitution on output lead 22 of a positive-going pulse waveform having a negative resting level for an applied negative-going pulse waveform which has a resting level of earth potential or vice-versa. An example of a practical circuit arrangement is illustrated in Fig. 9$b$ in which the well known inverting properties of an amplifier circuit including a thermionic valve V are employed, the output being by way of a cathode follower circuit CF as previously.

With the above provided knowledge regarding waveform voltage levels and the significance of the symbols employed, the various diagrams of Figs. 10 to 27 will be found largely self-explanatory as far as the arrangement and function of the various individual elements are concerned.

The operating rhythm of the machine is, as already stated, governed by a series of electric waveforms.

The basic controlling waveforms are provided by the generating arrangements shown in Fig. 10 and which comprise a 100 kc./s. master or Clock oscillator XO whose output is squared asymmetrically in the circuit DWG to provide the Dash waveform of diagram ($a$) Fig. 2, comprising a negative-going pulse in the first 7 microseconds of every 10 microsecond interval. Such 10 microsecond intervals constitute the digit-intervals in the rhythm of the machine. The output of the Dash waveform generator DWG is applied to a differentiating circuit DTG to form the Dot waveform of diagram ($b$) Fig. 2, comprising a series of short negative going pulse of 1½ microseconds' duration whose leading edges are coincident in timing with those of the Dash waveform pulses. Such Dash and Dot waveforms are used extensively in connection with the reading, writing and regeneration circuits of the various cathode ray tube storage devices as described in reference A. Such devices also use the Strobe waveform which is not specifically shown in the present case but which comprises a narrow positive-going pulse just after the leading edge of the Dot and Dash pulses.

The output of the Dash waveform generator is also applied to a frequency-dividing circuit DVC of any convenient form, such as a phantastron circuit of the kind described in U. S. A. Patent No. 2,549,874, granted April 24, 1951, to F. C. Williams which serves to count-down the Dash waveform pulses and provide an output pulse in synchronism with every 24th Dash pulse. This 24 digit-interval time period constitutes the beat period of the machine made up of the group of 24 consecutive Dash pulses $p0$, $p1$ . . . $p22$, $p23$. From the combination of the divider circuit output and the Dash waveform in a pulse separator circuit PPG, of the kind shown in Fig. 28 and described later, is derived a series of isolated Dash pulses, one on each of 24 separate leads and coincident respectively with the Dash pulses of the digit intervals $p0$, . . . $p23$ of each beat period. The resultant series of isolated pulses are referred to as the $p$-Pulse series, the particular $p$-Pulse coinciding with the digit interval $p0$ of each beat being known as the $p0$ $p$-Pulse and so on. Diagrams (d)–(h), Fig. 2 illustrate the $p0$, $p1$, $p2$, $p22$ and $p23$ $p$-Pulse waveforms.

Fig. 28 shows a suitable form of such pulse separator circuit PPG. This circuit comprises 24 similar stages S0, S1, S2 . . . S23 of which only those of S0 and S1 associated respectively with the separation of the $p0$ and $p1$ $p$-Pulses are shown in full.

The circuit of each of these stages comprises a pentode valve such as $V10^0$ with which is associated diode valves such as $V11^0$ and $V12^0$. The input pulses from the divider circuit DVC are applied to the control grid of the valve $V10^0$ through the diode $V11^0$ whereby the trailing, positive-going, edge of each of these pulses, which occur in synchronism with the $p23$-pulse of Fig. 2(h), causes the turning on of valve $V10^0$ at its control grid although this valve is at the same time held cut off at its suppressor grid by the, then negative-going, state of the inverse or anti-phase version of the Dash waveform which is supplied to the suppressor grid. The turning on of valve $V10^0$ causes screen current to flow with a resultant tendency for the falling potential of the screen of the valve, to drive the control grid negative through the coupling condenser C28 thereby opposing the positive movement of the grid voltage produced by the input pulse from the divider circuit DVC. The condenser C28 acts in a manner similar to that of the well-known Miller circuit to cause the control grid of $V10^0$ to be held at about cathode potential for a substantial period of time after the end of the initiating input pulse and which time period extends into that of the next following Dash pulse of the time interval $p0$ whereby the valve $V10^0$ is turned on at its suppressor grid to cause anode flow during that period. This anode flow causes a negative-going pulse to be developed at the valve anode in coincidence with the $p0$ Dash pulse and this pulse is available as the $p0$ $p$-Pulse at the terminal $p0$ as shown. The same anode waveform is applied as a triggering input to the valve $V10^1$ of the next stage S1 through a similar diode valve $V11^1$. The trailing edge of this negative-going pulse operates in similar manner to turn on the valve $V10^1$ at the end of the $p0$ Dash pulse whereby that valve accepts and passes the next following dash pulse of time interval $p1$. The lowering of the screen potential of valve $V10^1$ which occurs at the end of the $p0$ Dash pulse time is fed back to the valve $V10^0$ through condenser C128, resistance R128 and diode $V12^0$ to cut off valve $V10^0$ once more at its control grid whereby this valve is then inoperative until the arrival of the next input pulse from the divider circuit DVC.

A similar operation occurs with each successive Dash pulse of the series $p0$ . . . $p23$, the last stage S23 of the group being operated during the time of pulse $p23$. The next following pulse is, of course, the $p0$ pulse of the next beat period whereupon valve $V10^0$ is again operative to recommence the cycle. The output from the screen grid of valve $V10^0$ is fed back to the equivalent valve in the last stage S23 of the group and operates the latter to its cut-off state in a precisely similar manner to that of the other stages since effectively, $p0$ immediately follows $p23$ in the pulse series.

A trigger circuit BOWG triggered by the trailing edge of each $p19$ $p$-Pulse and reset by the trailing edge of each $p23$ $p$-Pulse provides the Blackout waveform shown in diagram (c) Fig. 2 and consisting of a negative-going pulse extending over the 40 microsecond time period in each beat of operation embracing the $p20$, $p21$, $p22$ and $p23$ $p$-Pulses. This blackout waveform, in addition to its use in the various cathode ray tube storage devices in the manner described in the aforesaid reference A, is also widely used for various gate controlling purposes and the like and its points of application in the various figures will be indicated by the symbol BO.

As already stated, under normal operation the machine operates with a rhythm of four beats, S1, A1, S2 and A2 to each bar. Each bar is initiated by the release of a special starting signal or Prepulse, as shown in diagram (a) Fig. 3, and after the termination of any bar the next following bar cannot commence until a further Prepulse is released.

The total of 20 digit positions, $p0$ . . . $p19$, available in each beat for actual number signalling purposes, while adequate and optimum for the handling of instruction words in beats S1, A1 and S2, may not be adequate for the handling of extended length number words in the A2 beat and it is then necessary to extend the bar by addition of one or three further beats to afford a total digit capacity of either 40 or 80 digits during the time in which number words are being actively handled.

Figure 3:
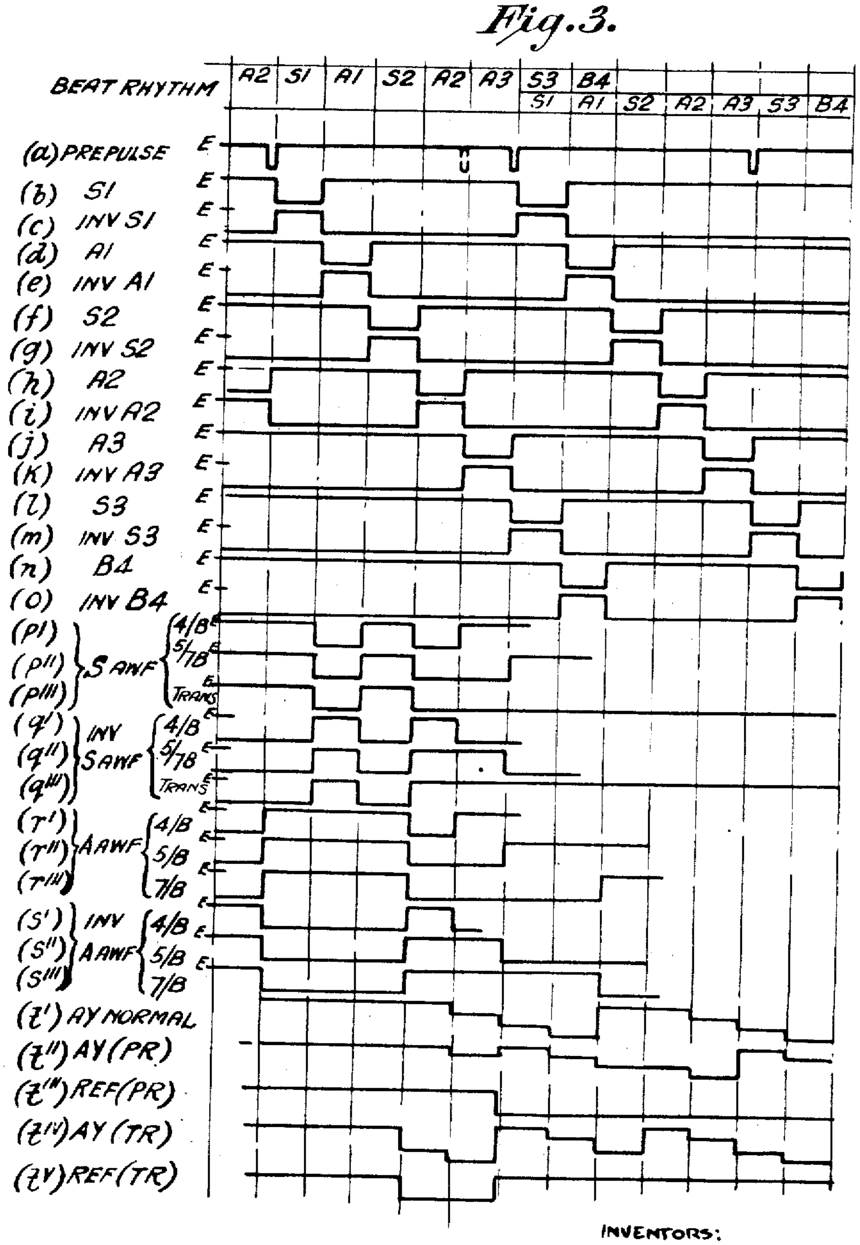

This extension of a bar to provide a further action beat immediately following the A2 beat and hereinafter referred to as the A3 beat, is effected by withholding the release of a Prepulse until the termination of the additional A3 beat as shown in dotted lines in diagram (a), Fig. 3.

In view of the fact that the main store S, the control unit C and the static register unit STU are the only machine elements necessary for operation in the S1 and A1 beats while the extension beats beyond the fifth beat will invariably be concerned only with other machine elements such as the accumulator A, such sixth and seventh beats of an existing bar may be arranged to overlap the S1 and A1 beats of the next bar so that the above described delayed release of a Prepulse at the end of bar A3 will be suitable for both 5 and 7 beat operations. The sixth beat constitutes a third scan beat and will hereinafter be referred to as the S3 beat whereas the seventh beat will for identification hereinafter be referred to as the B4 beat.

During transference of blocks of information items, i. e., number and instruction words, between the main or immediate access store S and the magnetic or subsidiary store W it is necessary to prolong the bar in which the transfer is started by a very large number of beats and it is accordingly necessary to provide means whereby, under such conditions, the release of the Prepulse which initiates the next bar is similarly delayed.

In order to allow the provision of a Prepulse at the end of any required beat period according to the particular requirements of the machine operations which are taking place, such Prepulses are derived fundamentally from the Blackout pulses which occur at beat intervals and selection then made as to which BO pulse is to be used for such purpose.

Figures 11, 12, 13, 14, 15, 16, 17:
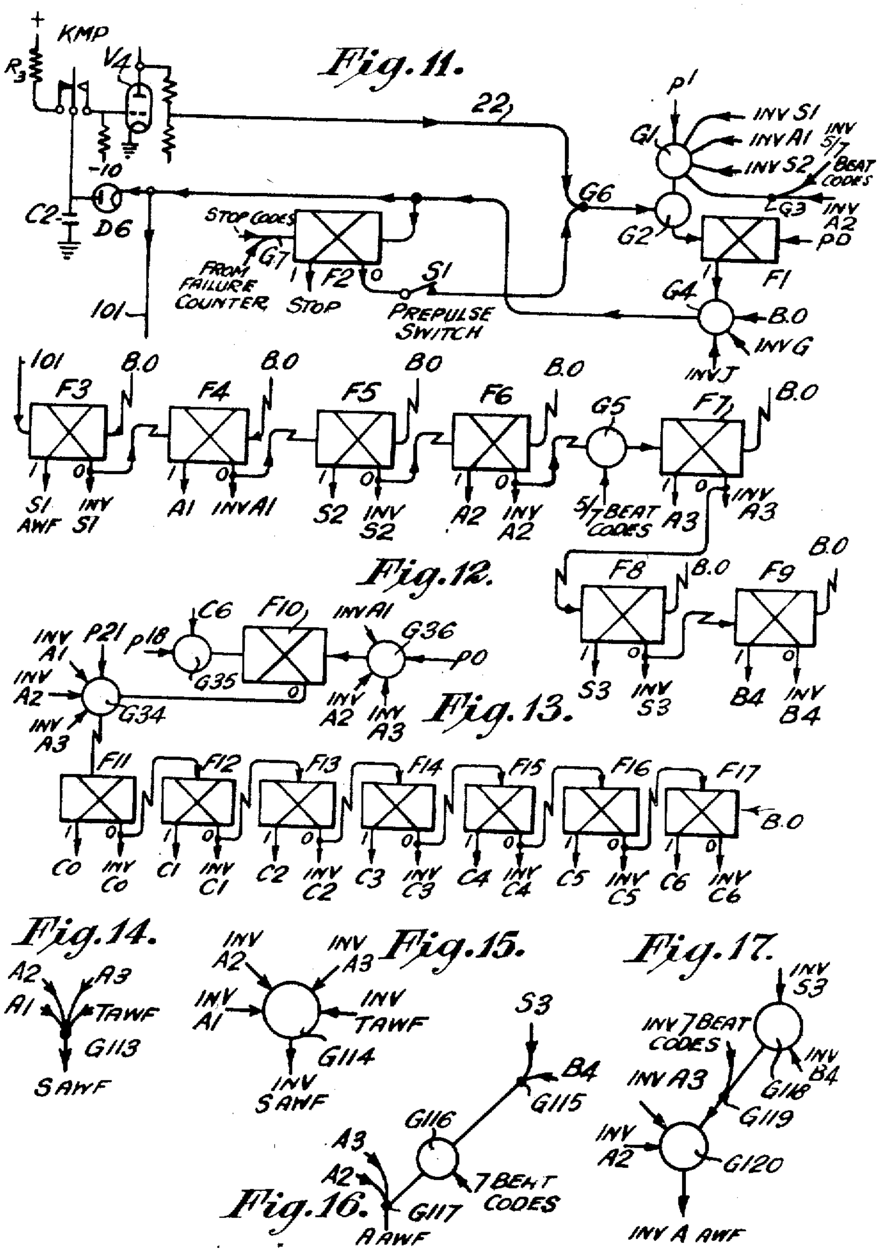
Fig. 11 is a more detailed schematic diagram illustrating the arrangements for generating the prepulses which control the initiation of each operative step.
Fig. 12 is a similar schematic diagram of the arrangements for generating the Scan/Action waveforms which control the beat rhythm of the machine.
Fig. 13 is a similar schematic diagram of the arrangements for generating the Counter waveform series.
Figs. 14, 15, 16 and 17 are schematic diagrams illustrating the arrangements for generating the S AWF, INV S AWF, A AWF and INV A AWF waveforms respectively.

The Prepulse generating arrangements are shown in Figure 11. These generating arrangements include an "and" gate G1 supplied with the P1, INV S1, INV A1, INV S2 and a further control potential which is a combination through "or" gate G3 of the INV A2 waveform and the inverse version of the code signal, set up on the static register sections $f13$ . . . $f19$, Fig. 20, which are controlled by the function or $f$ digits of the instruction word, and which occurs only when such instruction calls for a 5/7 beat operation. The output from gate G1 is applied to a further "and" gate G2 which is controlled by a potential derived from an "or" gate G6 whose inputs will be referred to later. The output from gate G2 is applied to the triggering input terminal of a trigger circuit F1, the resetting terminal of which is continuously supplied with the $p0$ $p$-Pulses.

The left hand or "1" output terminal of this trigger circuit F1, which is negative when the trigger circuit is triggered and is at earth at other times, is applied as one controlling input of a further "and" gate G4 which is also supplied on other input terminals with the BO, INV G and INV J waveforms whose main or anti-phase version is shown respectively in Figure 4(*j*) and Figure 4(*k*). The derivation of these G and J waveforms will be described later with reference to Figs. 27 and 25 respectively. The output from this gate is fed to the resetting terminal of a further trigger circuit F2 and also to an output lead 101 (which carries the Prepulses to other parts of the machine) and to the cathode of a diode D6. The triggering input terminal of trigger circuit F2 is supplied by way of an "or" gate G7 with the Stop code signal derived from the function static register sections *f*13 . . . *f*19, Fig. 20, of the static register device STU when the instruction is one calling for stopping of machine operation and also by a wave-form which is negative only when a failure counter device, constituted by the elements F37 and G154 of Figure 23(*a*) goes negative. The output from the left hand or "1" output terminal of the trigger circuit F2 supplies the Stop waveform whereas the opposite or "0" terminal of the trigger circuit is connected to a two-position switch S1 which, when closed, applies the output potential from such trigger circuit terminal as one input to the "or" gate G6 supplying gate G2. The other input of "or" gate G6 is by way of lead 22 from the anode output circuit of a valve V4 whose control grid is normally biased negative by connection through a leak resistance to a source of negative potential −10 v. This control grid is connected to the back contact of a key KMP which normally completes a circuit from a source of positive potential (+) through resistor R3 to the anode of diode D6 and to one terminal of a capacitor C2 whose opposite terminal is connected to earth.

In the operation of the arrangements shown, *p*1 *p*-Pulses will pass through gate G1 except during any S1, A1 or S2 beat (since the INV S1 waveform is at earth during beat S1, the INV A1 waveform is at earth during beat A1 and the INV S2 waveform is at earth during beat S2) and except during any A2 beat which occurs during the setting up of the 5/7 beat code by the *f* digits of an instruction on the function static register sections in the manner previously described (since neither the INV A2 or INV 5/7 beat code will then be negative).

A *p*1 *p*-Pulse will thus pass to gate G2 only during the A2 beat when 5/7 beat working is not called for or, during A3 beat whenever this occurs. The gate G2 is controlled in a manner described later and, during normal automatic running, is supplied continuously with a negative potential to hold it open whereby the *p*-1 *p*-Pulse passed through gates G1 and G2 serves as a triggering input to trigger circuit F1 which, upon being triggered, provides a negative-going gate controlling voltage to the gate G4. After any such triggering the trigger circuit F1 is reset by the *p*0 *p*-Pulse of the next following beat.

Gate G4 controls the passage of the Blackout waveform therethrough and, in addition to the aforesaid opening voltage provided by the trigger circuit F1 for the period between the *p*1 *p*-Pulse of a selected beat and the *p*0 *p*-Pulse of the next following beat, is also controlled by the further waveforms INV J and INV G, the effects of which are to allow the aforesaid Blackout waveform to pass during the triggered period of the circuit F1 except during the special transference of numbers into and out of magnetic storage devices associated with the machine as described later. The output from gate G4, consisting of a selected Blackout pulse constitutes the prepulse signal which is passed to the lead 101.

Means are provided for emitting a single Prepulse under manual control whereby the machine will operate through a single bar only and this is effected by means of the switch S1 and key KMP. Both switch and key are normally in the positions shown for automatic running. For providing a single manual Prepulse switch S1 is opened and key KSP momentarily depressed. When thus operated to release a manual prepulse, switch S1 prevents trigger circuit F2 from providing a continuous negative gate-opening potential to the gate G2 thereby closing such gate except when a suitable negative-going waveform is supplied through the other lead 22 to the "Or" gate G6. The normal auto-running position of the key KMP is such that the condenser C2 is charged positively through the resistance R3 and changing of key position causes application of this positive potential to the grid of the valve V4 and the accompanying appearance of a negative-going waveform on the lead 22 which, by passing through the "Or" gate G6, provides the necessary substitute for the opening potential previously provided by the trigger circuit F2. The next following *p*1 *p*-Pulse after the instant of operation of the key switch KSP therefore passes through the gate G2 and results in the generation of a Prepulse in a manner similar to that already referred to.

It is imperative that only one Prepulse be released per key operation and as the period of closure of the key may easily extend over a considerable number of possible prepulse instants or as the contacts of the key may bounce and make several successive closures, the Prepulse thus released through gate G4 is applied through the diode D6 to effect discharge of the condenser C2; in consequence the valve V1 is again cut-off even if the key contacts are still closed and the negative potential previously available through gate G6 is removed and gate G2 closed again.

The trigger circuit F2 normally rests in a condition whereby a negative-going output is available through the switch S1 (when closed) for application to the gate G2 but this trigger circuit may be reversed into its triggered state whereby such negative potential is inhibited by the application as a triggering input of either a special stop code signal (*f* digits −δ0δ10δ1) or a pulse from a failure counter of the machine which is passed through the "Or" gate G7. The purpose of the failure counter is to stop the machine under certain conditions resultant from a checking operation.

The trigger circuit F2 is reset after it has been triggered at any time, by the next following Prepulse delivered through the gate G4. This prepulse is one generated manually by operation of the key switch KMP, the switch S1 being also closed in readiness for automatic operation if required.

In the present machine the various beat controlling waveforms, and a considerable number of further special waveforms, are provided by appropriate selection and/or combination, in gate or buffer circuits or the like, of individual square pulse waveforms each of which defines the period of a single one of the various possible beats S1, A1, S2, A2, A3, S3 and B4.

These various waveforms are generated by the arrangement shown in Fig. 12 and comprise a counter chain of trigger circuits F3, F4, F5, F6, F7, F8 and F9. The first trigger circuit F3 is triggered by any generated Prepulse on lead 101 and is retriggered by the next following Blackout waveform pulse suitably differentiated whereby the trigger circuit F3 provides on one of its outputs a waveform called the S1 and shown in diagram (*b*), Fig. 3. This waveform is negative-going during the S1 beat period only. The opposite output of the trigger circuit F3 provides an inversion of this waveform called the INV S1 and shown in diagram (*c*), Fig. 3, and which is negative-going at all times except during the S1 beat.

The negative-going edge of the last mentioned waveform, coincident with the end of the S1 beat, is used as a triggering medium for the next following trigger circuit F4 which is accordingly triggered at an instant which marks the commencement of the next following or A1 beat. This second trigger circuit is similarly reset by the Blackout waveform and is accordingly reset at a point which marks the end of the A1 beat. Two alternative outputs are provided from this circuit, one the A1 which is negative-going during the period of the A1 beat only as shown in diagram (*d*), Fig. 3, and the INV A1 which is negative-going at all times except during the A1 beat, as shown in diagram (*e*), Fig. 3. The further trigger circuits F5 and F6 are arranged in similar manner to provide the similar waveforms of S2 and INV S2 and A2 and INV A2 covering respectively the S2 and A2 beats and shown in diagrams (*f*), (*g*), (*h*) and (*i*), Fig. 3.

The differentiated INV A2 waveform from the trigger circuit F6, marking the end of the A2 beat is used as a triggering input to the trigger circuit F7 only when the gate G5 through which it is passed is opened by the application thereto of a potential caused by the setting up of the 5/7 beat code by the *f* digits of the controlling instruction word. When the gate G5 is thus opened the end of the A2 beat will cause triggering of the trigger circuit F7 and the generation of a further pair of waveforms, A3 and INV A3 covering the A3 beat period as shown in diagrams (*j*) and (*k*), Fig. 3. From the differentiated INV A3 waveform output of such trigger circuit is derived the triggering input for a further trigger circuit F8 which, in similar manner provides a pair of waveforms, the S3 and the INV S3 covering the S3 beat period as shown in diagrams (*l*) and (*m*), Fig. 3. The INV S3 output waveform similarly provides a triggering medium for yet a further trigger circuit F9 which, again in a similar manner, provides a pair of output waveforms B4 and INV B4 covering the seventh or B4 beat period as shown in diagrams (*n*) and (*o*), Fig. 3.

Various special waveforms whose use will be referred to hereinafter are generated by combining appropriate ones of the various outputs from the trigger circuits F3 . . . F9. Fig. 14 shows the manner in which the waveform known as the S AWF is provided by combining in the "Or" gate G113 the waveforms A1, A2 and A3 and a further waveform T AWF which is concerned with magnetic transfer operations and which will be described later. The resultant composite waveforms vary according to whether the machine is operating under 4 or 5/7 beat rhythm or on transfer and the related waveforms for each condition are shown in diagrams ($p^{I}$), ($p^{II}$) and ($p^{III}$), Fig. 3. The inverse version of this waveform, INV S AWF, shown in diagrams ($q^{I}$), ($q^{II}$) and ($q^{III}$) for the same three conditions is obtained as shown in Fig. 15, by combining in an "And" gate G114, the four waveforms INV A1, INV A2, INV A3 and INV T AWF. Fig. 16 shows how the waveform A AWF is derived by the application of the S3 and B4 waveforms through the "Or" gate G115 to the "And" gate G116 where, upon the occurrence only of the special 7 beat code (*f* digits δ1δδδδ0), such combination is passed to the "Or" gate G117 where it is combined with the waveforms A3 and A2, the resultant waveform having different forms under 4, 5 and 7 beat rhythm conditions as shown in diagrams ($r^{I}$), ($r^{II}$) and ($r^{III}$), Fig. 3. The inverse version of this waveform, INV A AWF, is generated in the manner shown in Fig. 17 by the application of the INV S3 and INV B4 waveforms to an "And" gate G118, the output of this gate being then combined with the inverse version of the 7 beat code signal in the "Or" gate G119 and used as one controlling medium for a further "And" gate G120 which is also supplied with the INV A2 and INV A3 waveforms. The resultant waveforms under the 4, 5 and 7 beat rhythm conditions is shown in diagrams ($s^{I}$), ($s^{II}$) and ($s^{III}$), Fig. 3.

Various operations, such as the systematic regeneration of each of the different address positions in the cathode ray tube storage devices which necessarily extends over a number of complete bars, require the provision of a series of Counter waveforms as described in reference A, particularly in connection with Figs. 23, 24, 25, 35, 36 and 37 thereof. In view of the fact that the rhythm of the present machine is no longer fixed with alternate scan-action beats, the form of such Counter waveforms must vary with changes of the number of beats to the bar rhythm. In the present machine these are provided by the arrangements shown in Fig. 13 and comprising a series of trigger circuits F11, F12, F13, F14, F15, F16, F17 each serially triggered from the preceding stage in the manner shown whereby each successive stage effectively counts down by a factor of 2. The triggering of the first circuit F11 is effected during every scan beat by the *p*21 *p*-Pulse applied through the gate G34, which gate is controlled by the INV A1, INV A2, and INV A3 waveforms and by a potential derived from a trigger circuit F10. The latter is effective to open the gate only when in its reset condition.

In the operation of this counter chain the gate G34 is normally open except during beats A1 and A2, and A3 when this occurs, i. e., during each Scan beat. During these beats the *p*21 *p*-Pulse series is passed through the gate and, after differentiation, is used as a triggering medium for the first trigger circuit F11 whose respective outputs provide the first counter or C0 and the INV C0 waveforms. These waveforms may have several different forms according to whether 4 beat or 5/7 beat rhythm or transfer is being operated. Diagram (*a*) Fig. 4 shows the C0 waveform under continued 4 beat rhythm, diagram (*b*) the form under continued 5/7 beat rhythm and diagram (*c*) the form under magnetic transfer. Diagram (*d*) illustrates the INV C0 waveform corresponding to the form of diagram (*a*). The negative-going edges of the INV C0 waveform serve, after differentiation, as the triggering medium for the second trigger circuit F12 which is accordingly reversed at every second reversal of the first circuit F11 and provides a second pair of counter waveforms C1 and INV C1. The form of each of these corresponding to the form of diagram (*a*) is shown in diagrams (*e*) and (*f*), Fig. 4. The remaining circuits F13, F17 are coupled together in similar manner whereby they each operate at progressively halved rates and provide the C2 and INV C2, the C3 and INV C3, the C4 and INV C4, the C5 and INV C5 and the C6 and INV C6 waveforms. The last trigger circuit is triggered in one direction only by its input from the preceding trigger circuit and is reset immediately at the end of the beat at which it has been triggered by the next following Blackout pulse.

The arrangement of the main store S is shown in Fig. 18. It comprises a total of 16 storage tubes of which only two, TB1 and TB2 are shown, each with their associated ancillary apparatus including pick-up electrodes 30, amplifiers 31, read units 32 and write units 33 as described in reference A. The detailed form of each amplifier 31 is shown in Figure 31 of the aforesaid reference A while the detailed form of each read unit 32 and write unit 33 is shown, as a combined single unit, in Figure 32 of the same reference under the style of "gate circuit."

Referring to the aforesaid Figure 32 of reference A, valves V1 and V2 thereof together with their associated diodes D1, D2, D3, D4 and D5 constitute the read unit 32 of the present disclosure, the read output terminal being constituted by that which is connected to the cathode of valve V2. The write unit 33 of the present disclosure is constituted by valves V3 and V4 of the aforesaid reference figure, together with associated diodes D6, D7 and D8, the read output terminal being that connected to the cathode of valve V4 and the write input terminal being a duplication of the previous read output terminal of the read unit but connected only to the control grid of valve V3. In other words the connection between the cathode of valves V2 and V3 is broken and brought out o this separate write input terminal. As will be described later in connection with Fig. 30 of the present lisclosure, a further valve is associated with the valves √3 and V4 of the write unit for the purpose of rendering one only of the 16 similar storage tubes operative during action beat periods. The remaining tubes are connected n parallel with those shown through multiple input buffer gates such as that illustrated at G10. Each tube is arranged to contain 64 address locations in two side-by-side vertical columns or pages each of 32 lines.

The arrangement of the main store will be clear from Figure 18 after due regard to the interpretation of the various symbols therein given in connection with Figures 5–9.

The horizontal or X-scanning motion of the tube beams is controlled by the X-time base circuit XTB which is, however, in this instance provided with an additional modifying control to superimpose the necessary lateral or page shift to deal with one or the other of the two pages of storage capacity on any tube. This is effected, in the case of systematic regeneration, by the application of the C5 waveform through gate G33 and buffer gate G31 and, in the case of instruction words by the output from the L5 staticisor section applied through gate G32 and gate G31.

Figures 24, 25, 26, 27:
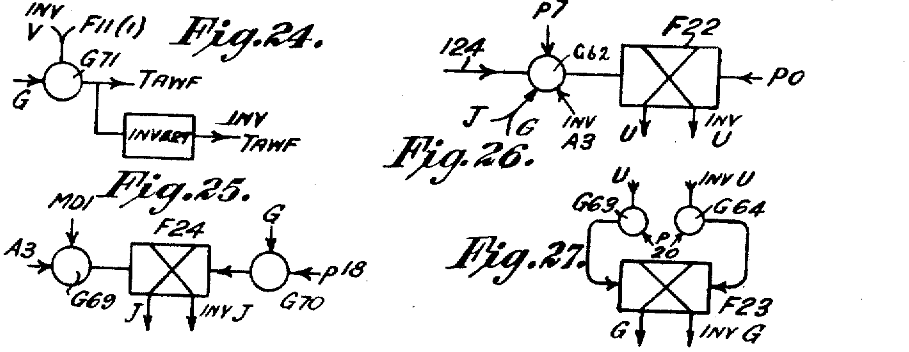

The Y-scanning potentials which determine the choice of the 32 horizontal lines for action at any particular beat are provided by the Y-scan generator YSG which follows the form described in reference A, see particularly, Figures 23 and 24. In the present instance, however, as the regular scan, action, scan, action beat rhythm of the tube arrangement described in the reference A is present only under 4 beat to the bar rhythm slight modification of the connection of the controlling waveforms is necessary to accommodate the variations of 5, 7 or more beats to each bar. The arrangement of Fig. 23 of said reference A is redrawn in Fig. 29 of the present application. In this figure the Y-shift valve Y as in the aforesaid reference A, controls the amount of current flow through resistor $R^1$ and in turn determines the amplitude of the push-pull deflection voltages applied to the Y plates of each of the cathode ray tubes TB1, TB2 . . . of the store. As in the reference A arrangement, the amount of current flow through this resistor $R^1$ is determined by the selective turning on or off of a plurality of further valves T0, T1, T2, T3 and T4 whose cathodes are each connected to a source of negative potential by way of individual resistors R, R/2, R/4, R/8 and R/16 whose values have relationships such that the current through the resistor of the second valve is twice that of the first, that through the third, twice that of the second and so on. The control grid of each of these valves T0, T1 . . . T4 is connected to a separate control input terminal 0, 1, 2, 3, 4, as also shown on the Y-scan generator YSG, Figure 18. These control terminals are respectively supplied with control voltages derived through an associated "or" gate G300, G301 . . . G304 from one or the other of two gates such as G177/0 and G29/0 which are controlled respectively by the appropriate one of the counter waveforms C0, C1 . . . C4 and by waveforms outputs developed on the *l* or line-address selector section *l*0, *l*1, *l*2 . . . *l*4 of the static register STU described later in connection with Fig. 23*b*. Each of the gates G29/0 . . . G29/4 is controlled by the SAWF waveform, Figs. 3 $(p^{I})$, $(p^{II})$ or $(p^{III})$ whereas the gates G177/0 . . . G177/4 are each controlled by the INV SAWF waveform, Figs. 3 $(q^{I})$, $(q^{II})$ or $(q^{III})$ so that when one gate of a pair is open the other is closed. This gate arrangement avoids the necessity of using two triode valves for controlling each current governing resistor R, R/2 . . . as shown in the reference A. A single triode can be used or the previous double triode arranged with its electrodes strapped together. Under normal four beat rhythm, the alternate scan beats are occupied with progressive regeneration of each stored line by means of a stepped waveform. This is generated by the application of the C0, C1, C2, C3 and C4 waveforms to the generator circuit YSG through the gates G177/0 . . . G177/4. The control of line selection during the intervening action beats is effected by the application of outputs from the L-staticisor sections shown in Fig. 23*b* as alternatives to those of the counter waveforms just described. These staticisor inputs are supplied through gates G29/0 to G29/4.

The selection of one tube out of the total of 16 for operation during any Action beat is effected by appropriate control of the write units from the *e*-Staticisor sections shown in Fig. 23*b* and influenced by the *e* digits of each instruction word. All tubes except that which contains the required item have their beam blacked out during such action beats. The arrangement of the write units 33 for control by the potentials from the *e* static register sections is shown in Fig. 30 which illustrates the two valves V30, V31 of the write unit together with a further valve V32, known as blackout valve. This valve V32 has its anode connected to the anode of valve V30, its suppressor grid supplied with INV S AWF waveform, its screen grid connected to the source of positive potential +300 v., its cathode connected to earth and its control grid connected through resistor R310 to one end of each of four high value resistors R311 each connected to separate input terminals 312 which are those shown in Figure 18 as supplied with potentials from the different *e* static register sections of the static register unit STU. These terminals are connected in a manner analogous to that of a code control circuit so that only when each of them is connected to a static register section terminal which is at a negative level, will be associated valve V32 be cut off at its control grid. In consequence of the different combination of connections used for each of the write units 33 of the main store, only one of these valves V32 will be cut off at any one time with any specific setting of the *e* static register sections by a particular instruction word. Whilst valve V32 is still turned on it is conductive and it so lowers the voltage at its anode that the control grid of the output valve V31 of the write unit is driven sufficiently negative to provide a negative output at its cathode the output from which cuts off the beam of the associated cathode ray tube. When, however, the particular combination of *e* static register section settings, determined by a particular instruction word, is such that all of the terminals 312 are connected to a negative potential then valve V32 is cut off, its anode is free to rise and the associated write unit becomes operative. As will be seen from Figures 3(*q*)1, (*q*)2 and (*q*)3 the INV S AWF waveform is negative-going during all S beats, so that the valve V32 in each of the write units 33 will be cut off during scan regardless of the potentials supplied to the terminals 311 and will thereby permit all of the write units to become operative during such scan beats for regeneration purposes as described in the aforesaid reference A.

The principal external inputs to the buffer G13 of the main store are as follows:

(*a*) By way of lead 106 and Inward Transfer Gate G14 from the accumulator A. Gate G14 is opened in A2 and A3 beats whenever the *f* digits of the Present Instruction word set up on STU call for an *a*,S (accumulator to main store) transfer. The control potential is derived in the usual way through a code control circuit.

(*b*) By way of lead 105 from the B-tube unit BU.

(*c*) By way of lead 114 and Magnetic Inward Transfer Gate G27 from the read heads of the magnetic store W.

(*d*) By way of lead 120 and either of gates G23 and G25 through buffer gate G24 from a set of 20 hand operable keys KN by which any desired combination of digits may be set up for insertion into the store. The hand keys K0 . . . K19 are constituted by a set of reversible switches having their respective moving contacts connected to the normal contact of a related switch S3. The normal contact of each key switch K0–K19 is connected to a source of positive potential while the back or off-normal contacts are connected in parallel to one section of a multi-pole change-over switch known as the Auto-Manual switch which determines whether the machine is to operate continuously in fully automatic manner or is to operate one bar at a time each under manual control as already explained in connection with the prepulse generating arrangements of Fig. 11. Such section of the Auto-Man switch serves to supply negative potential to each of the back contacts of hand switches K0 . . . K19 when in the Auto position and a positive potential, which acts as a blocking medium, when in the Manual position. The hand switches K0–K19 are not intended for operation under manual conditions. For manual condition operation, the related switch S3 is momentarily operated to its back contact which is connected to a source of negative potential.

The operation of any desired combination of the hand switches K0–K19, e. g. according to the configuration of a number or an instruction word which is required to be written into the store under Auto conditions provides a negative potential to the related gate of the series G19/0 . . .G19/19 through the associated switch S3 so that, as such gates G19/0 . . . G19/19 are supplied in turn with the appropriate one of the *p*-Pulse series *p*0 . . . *p*19 so a pulse train representative of the setting of the hand switches K0 . . . K19 will be made available at gates G23, G25 and G17. The gate G25 is opened in beat A2 whenever an instruction having *f* digits signalling a demand for an *h*,S (hand switches to main store) transfer is set up on the static register unit STU through the intermediary of a code control circuit.

The principal externally available outputs from the buffer gate G10 of the main store are as follows:

(*a*) By way of lead 115 to the write heads of the magnetic store W.

(*b*) By way of lead 116 to the control unit C.

(*c*) By way of lead 121 to the various F, T and E staticisor sections (Fig. 23*a*) which are associated with the initiation of the transfer operation to or from the magnetic store W.

(*d*) By way of lead 122 to the multiplier M.

(*e*) Through the Outward Transfer Gate G30.

(*i*) By way of lead 103 to the B-tube unit BU.

(*ii*) By way of lead 102 and gate G121 to the accumulator A.

(*iii*) By way of lead 104 to the most significant digit determining unit MSD.

In addition means are provided for erasing information by application of either, a suitable potential persistent for one or more beats or, one or more pulses coincident with selected digit positions, to the Erase terminals (see Fig. 32 of reference A) of the read units 32 of the stores. These erase potentials are derived through gates G20 or G22 or from the hand key switches KN. The erase potentials or pulses, in addition to application to such read units where they inhibit the passage of any "1" digits therethrough, are also applied to the master input gate G28 to allow simultaneous inlet of any new and replacement information.

Figure 19:
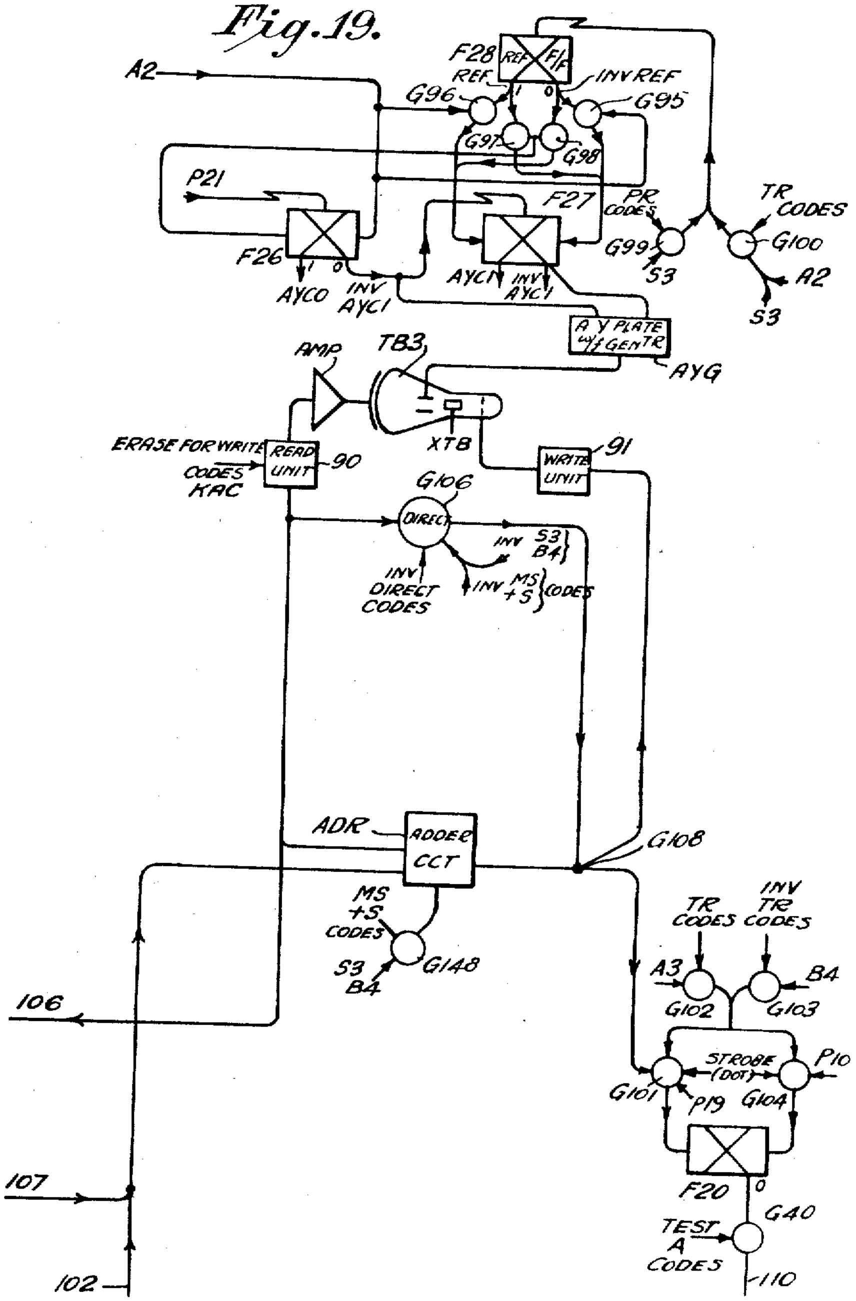
Fig. 19 is a schematic diagram of the arrangements of the Accumulator.

The arrangements of the accumulator are shown in Fig. 19 and, resemble, in general form, that described in reference B. By due consideration of the interpretation to be given to the various symbols depicted in Figures 5–9, its detailed form will be self evident.

The accumulator in the present machine comprises a cathode ray storage tube TB3 which is required to hold a total number length of 80 digits. This requirement arises as the result of multiplication of two 40 digit numbers and the requisite digits are stored upon four 20 digit lines. A repetitive X-time base is supplied to the X plates from the X-time base generator XTB (Fig. 18) but without any lateral shift and the line required is selected by a voltage applied to the tube Y plates from the Y-plate waveform generator circuit AYG.

It is necessary that the least significant 20 digits of the number in the accumulator, which are stored on the first line A*m*0, are scanned during the A2 beat, the next most significant 20 digits stored on the second line A*m*1, during the A3 beat, the next most significant 20 digits stored on line A*m*2, during the S3 beat, and the most significant 20 digits stored on line A*m*3, during the beat B4. This covers the 40 digit and 80 digit cases for transfer to and from the accumulator. The selection of the lines A*m*0, A*m*1, A*m*2 and A*m*3 on the accumulator is effected by means of Y-shift potentials supplied from the A Y-plate waveform generator circuit AYG. This circuit is similar to that shown in Fig. 29 except that, as only four output levels are needed, it comprises only two current control valves T0 and T1 with their respective input potentials supplied from two trigger circuits F26 and F27 providing respectively the controlling output waveforms AYC0 and AYC1 and inverse versions thereof. The trigger circuits AYC0 and AYC1 are connected as a two-stage binary counter and the first circuit AYC0 is triggered by the *p*21 *p*-Pulse so that the lines are scanned in order (in the absence of external interference) for regeneration purposes.

It is necessary to bring the two counters into step with the Action waveforms so that the lines may be scanned in order starting from line A*m*0 during beat $A_2$. This is arranged by a mechanism referred to as the "constraint" whereby the A2 waveform resets the circuit AYC0 at its leading edge, and also constrains the circuit AYC1 to the same state as what is known as the Reference trigger circuit F28 providing the REF and INV REF waveforms. This latter action is necessary to determine which way to set the circuit AYC1, as the label "least significant" and "most significant" has no absolute value but depends on the number of "permanent reversal" instructions which have been obeyed in the programme. The leading edge of the A2 waveform is therefore arranged to open two gates G95 and G 96 which allows the Reference trigger circuit F28 to constrain the AYC1 trigger circuit F27 at the beginning of the A2 beat.

For an instruction involving a "permanent reversal" the significance of the two pairs of lines has to be interchanged after the end of the A3 beat of the bar in which the permanent reversal instruction is given. This is arranged by triggering the trigger circuit F28 once with the leading edge of the G3 waveform through gate G99 under the control of the PR (permanent reversal) code signal derived in the usual manner from the *f* static register sections of STU when set up by an instruction word calling for the PR operation. At the A2 beat of the next bar the AYC1 trigger circuit F27 is constrained to the new state of the Reference trigger circuit F28 and the interchanging has been effected.

The other type of reversal instructions are the ones in which it is required to deal with the most significant parts of the accumulator during the A2 and A3 beats. For these instructions it is required to scan lines A*m*0 and A*m*1 during beats A2 and A3 respectively. This is not arranged by constraining the AYC1 trigger circuit F27; it is more conveniently arranged by triggering the Reference trigger circuit F28 twice through the gate G100 under the control of the TR (temporary reversal) code signals which are likewise derived from the *f* sections of STU in the presence of an instruction word calling for a TR operation. The AYC1 trigger circuit F27 is constrained to the Reference trigger circuit F28 at the beginning of A2 but the latter has been triggered, and is in the wrong state, so that the trigger circuit F27 gets constrained to the most significant part instead of the least significant part. Thereafter it is only necessary to trigger the Reference trigger circuit F28 again in order to preserve the information as to which is which, and the trigger circuit F27 will be corrected at the A2 beat of the next bar. The waveforms are shown in diagrams ($t^{I}$)–($t^{V}$), Fig. 3. The normal AY scanning waveform shown in Fig. 3 ($t^{I}$) derived from generator AYG provides scanning of accumulator lines A*m*0, A*m*1, A*m*2 and A*m*3 in order in beats A2, A3, S3 and B4 respectively of each beat, line A*m*0 being always the least significant line scanned in beat A2. Under PR (permanent reversal) conditions, shown in Fig. 3 ($t^{II}$) lines A*m*0 and A*m*1 are scanned in beats A2 and A3 respectively but upon reversal of the REF waveform, Fig. 3 ($t^{III}$) from trigger circuit F28, due to the PR instruction, lines A*m*0 and A*m*1 are scanned again in the following beats S3 and B4 followed by line A*m*2 in beat S2 of the following bar. In beat A2 of such following bar, line A*m*2 is scanned instead of A*m*0 and is thus now treated as the least significant line and is followed by line A*m*3 in beat A3, line A*m*0 in beat S3 and line A*m*1 in beat B4 and so on thereafter. Under TR (temporary reversal) conditions, shown in Fig. 3 ($t^{IV}$), accumulator lines A*m*2 and A*m*3 are scanned in beats A2 and A3 instead of lines A*m*0 and Am1 during the negative period of the REF waveform from trigger circuit *f*28, Figs. 3 ($t^{V}$) under such TR instruction, followed thereafter by lines A*m*0 in beat S3 and A*m*1 in beat B4. In the next bar, the scanning reverts to the normal order of lines A*m*0, A*m*1, A*m*2 and A*m*3 in beats A2, A3, S3 and B4 respectively.

The sign of any number held in the accumulator is indicated by the *p*19 digit of its most significant line. Provision is made for supervision of this digit position by the application of the output at the buffer gate G108 to the trigger circuit F20, known as the A Sign flip-flop, through gate G101. If such *p*19 digit is a "1" the trigger circuit F20 is triggered and produces a resultant effect in the control unit C as described later. Selection of the appropriate *p*19 digit position of the beats A3 or B4 according to whether a temporary reversal is operative or not is effected by gates G102 and G103 operative upon the triggering input and resetting control gates G101 and G104 of the trigger circuit F20.

Arranged in the regenerative loop between the read unit 90 and write unit 91 are an arithmetical circuit in the form of an adder ADR and an alternative direct path through regenerative gate G106. Each is controlled by the application of appropriate code signals derived as already described from the *f* static register sections in response to the appropriate combinations of *f* digits in the Present Instruction. The adder ADR is conveniently of the type described in U. S. Patent No. 2,643,820, granted June 30, 1953, to F. C. Williams et al.

Erasure from the accumulator is effected by applying a negative erase potential to the read unit 90. This occurs for depression of the Accumulator Clear Key KAC and for the Accumulator writing codes.

Results from the most significant digit detecting unit MSD are fed into the accumulator.

The inputs to the accumulator are:

(*a*) By way of lead 107 from the most significant digit unit MSD.

(*b*) By way of lead 108 from the multiplier M.

(*c*) By way of lead 102 from the main store S.

The output from the accumulator to the main store S is by way of lead 106.

Figure 20:
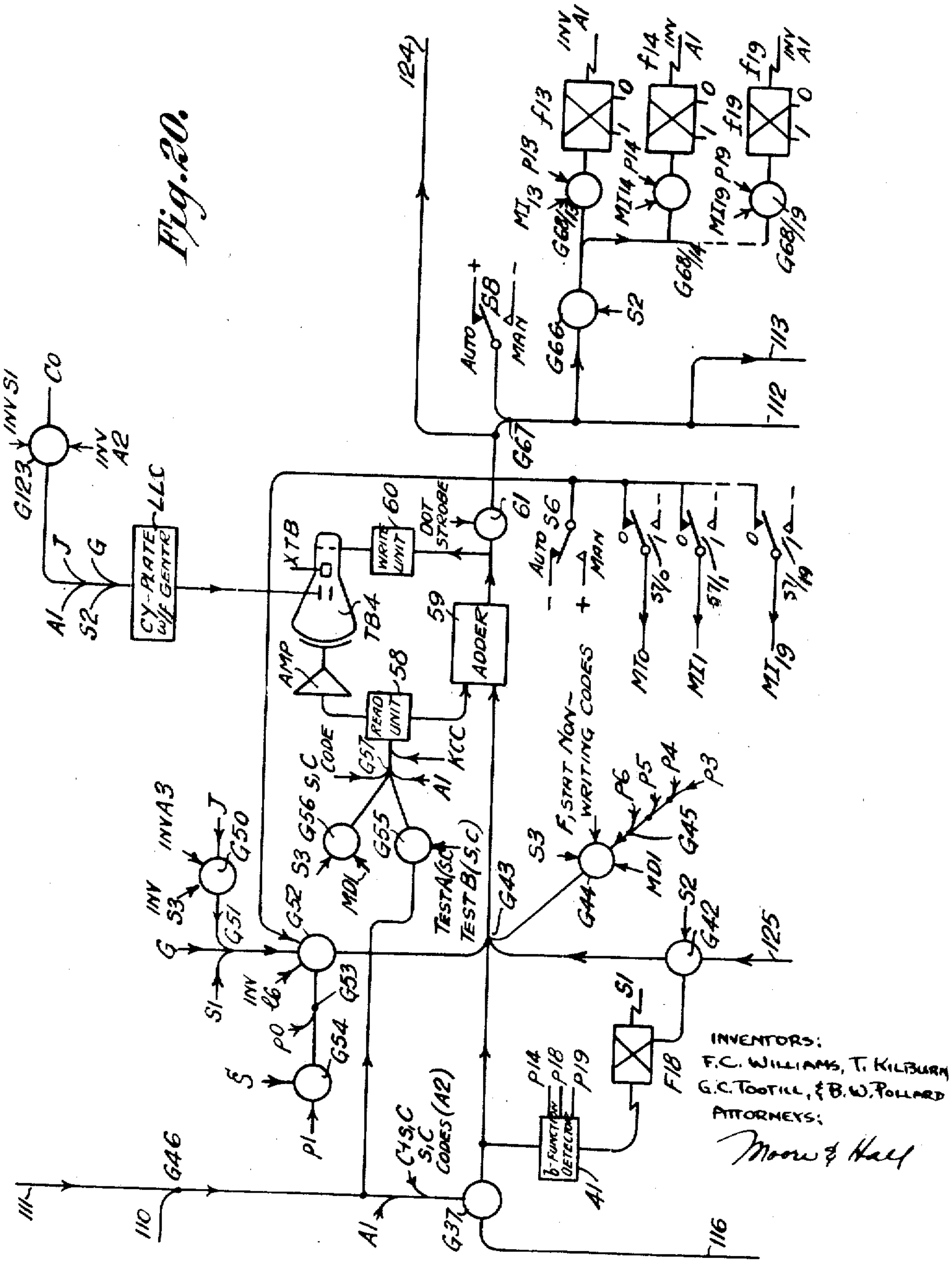
Fig. 20 is a schematic diagram of the control tube arrangements.

The arrangements of the Control Unit C of the machine are shown in Fig. 20 and resemble those described in reference B and, comprise a storage tube TB4 having two address lines on which are respectively written the control number, on the C line, which indicates during the S1 beat the number of the instruction to be executed and on the other line, the PI line, the present instruction itself which is transferred thereto from the main store S and which is or may be later modified by the use of the B-tube unit BU.

The tube TB4 has the usual regenerative loop including the read unit 58, write unit 60 and an adding circuit 59 which may be of any suitable type such as that described in U. S. A. Patent No. 2,429,227 to P. S. Herbst entitled "Electronic Computing System."

Deflection of the tube beam in the X-direction is effected continuously by application of the X-time base waveform from the circuit XTB (Fig. 18) without lateral shift while the Y-scanning sequence is line C in beat S1, line P1 in beats A1 and S2 and line C again in beat A2. In any subsequent beats of those bars which involve more than four beats the order of scanning is unimportant and it is convenient to scan them alternately during the succeeding beats. Such Y scanning deflections shown in diagram (*g*), Fig. 4, are provided by applying the C0 waveform to the gate G123 which is under the control of the INV S1 and the INV A2 waveforms so that it is closed during beats S1 and A2. In consequence only the resting level of the C0 waveform is passed to the Y-plate deflection waveform generator circuit LLC and the C line is consequently scanned. The A1 and S2 waveforms applied to the buffer gate G124 ensure that the PI line is scanned during these particular beats. The generator circuit LLC resembles that shown in Fig. 29 but with only one controlled current flow valve T0, giving two alternative scanning levels.

For the purpose of making use of the control unit on its PI line as a counter during the magnetic transfer operations as described later the G and J waveforms whose generation is described later with reference to Figs. 27 and 25 respectively are similarly applied to the gate G124 to ensure that the PI line is scanned continuously whenever one of these two transfer waveforms is operative and is negative-going.

Erasure of the contents of any line of the control tube may be effected by application to the erase input terminal of the read unit 58 of any of the following inputs combined in the buffer gate G57.

(*a*) An input from the Clear Control Key KCC. This is provided for operation at the beginning of the programme to ensure that the starting position is "0" on the CI line.

(*b*) The A1 waveform to ensure that the previous PI is properly erased as a new PI is written in.

(*c*) During the presence of any instructions (*s*,C) involving transfer from the main store S to this control unit C; the existing contents of the C line must then be erased during beat A2 as the new C number is introduced by way of the write unit 60, (*d*) To clear the PI line during beat S3 of any magnetic transfer instruction by combining the S3 waveform and the MDI waveform in gate G56. The nature of the MDI waveform will be described later with reference to trigger circuit F21 of Fig. 23(*a*)

(*e*) During the presence of one of the two conditional absolute control transfer instructions of Test A (*s*,C) and Test B (*s*,C) at gate G55 to ensure that for successful tests the negative waveform which appears as one of the inputs to the buffer gate G46 will be passed on to the Control erase terminal. A Test A instruction, signalled in the usual way by a particular combination of *f* digits of a present instruction word and set up on the *f* static register section of unit STU, is one calling for examination of the most significant digit of the accumulator content to determine the sign of the accumulator number. Similarly the Test B instruction is one calling for test of the most significant digit of the number held in a line of the B-tube. In both cases successful test will result in the transfer of a new CI number to the control tube so as to effect a transfer in the programme of instructions. Therefore, as in the case of *s*,C (store to control) instructions already noted, the previous C number will be erased as the new C number is written in.

The inputs to the control unit through its writing unit 60 consist of the two inputs to the adder circuit 59, one of which is that derived from the read unit 58 and the other of which is derived by way of the buffer gate G43 from any of the following sources.

(*a*) From a selected address in the B-tube unit BU whenever it is required to modify an instruction number on the PI line. The B-tube signal is fed through the gate G42 which is opened during the S2 beat provided the trigger circuit F18 has not been set as a result of detection of certain *f* digits in the arriving Present Instruction by the B-function detector 41. Those instructions which are not required to be modified by their B digits, i. e. those signalled by the function digits δ1δδδ11 are detected by such B-function detector which gives a negative-output to trigger the trigger circuit F18 if "1" digit pulses are present in the *p*14, *p*18 and *p*19 digit positions.

(*b*) From the main store S whenever access to the control tube by way of gate G37 is allowed during every A1 beat and also during A2 beats of the unconditional control transfers and of successful conditional control transfers; thus the new PI is routed by way of the adder 59 into the PI line in the former case and the new control number is added into the C line in the latter.

(*c*) From the gate G44 during the S3 beat of any non-writing magnetic transfer instructions when the number 120, i. e. 0001111 is put into the PI line by combination in the gate G45 of the *p*4, *p*5, *p*6 and *p*7 *p*-Pulses when the gate G44 is opened by the S3 waveform in combination with the MDI waveform and the particular codes signalling non-writing transfers set up on the F-Staticisor sections (Fig. 23*a*). This is to ensure that nothing happens if these same staticisor sections are set up during multiplication for which they are also used. The corresponding simultaneous erase input to the read unit 58 is applied by way of the gate G56 as previously described.

(*d*) From the gate G52 when it is required to add in the *p*0 *p*-Pulse through the gate G53 under the following conditions:

(*i*) During beat S1 under a control for gate G52 derived through gate G51 in order that the control number C1 on line C of tube TB4 may be increased by "1" and the orders obeyed sequentially in the order in which the instruction words are put into the main store S. The exception of this rhythm occurs when operating manually and under this condition the positive voltage derived from auto-manual switch S6 closes this gate. In this latter case the appropriate instructions are set up on the manual instruction Switches S7 the switch S6 being in the manual position, i. e. one supplying a positive voltage. The operation is then performed by means of the switch key KMP (Fig. 11).

(*ii*) During magnetic transfers when the PI line of the tube TB4 is being used as a counter and it is required to add "1" into this line at the beginning of every beat except the S3 beat which follows the setting of the J trigger circuit G50 (Fig. 23*b*) which will be described later.

(*iii*) After a check instruction when the input ξ to gate G54 from the failure counter arrangements (Fig. 23*b*) allows the *p*1 *p*-Pulse as well as the *p*0 *p*-Pulse to be added into the C line of the tube TB4 if the contents of the specified track and stores are identical. Otherwise only the *p*0 *p*-Pulse will be added to the C line and the programme will then cause the transfer to be repeated.

The outputs from the control tube are arranged to pass through a Strobe unit 61 which is effectively a pulse shaping circuit identical with a write unit, see valves V1, V2 and diodes D1 . . . D5 of Fig. 32 of reference A. The Strobe input of such reference A circuit is constituted by the inverse version (positive-going) of the Dot waveform whereby any "*l*" representing pulse applied thereto is regenerated to an ideal form resembling a Dash pulse so as to render it satisfactory for use for the following purposes.

(*a*) During magnetic transfers when the output of the PI line, now operating as a counter is applied by way of lead 124 to gate G62 (Fig. 26) which is opened only during the time of the *p*7 *p*-Pulses provided also that either the J or the G waveform and the INV A3 waveform are applied thereto. Any *p*7 pulse and "1" digit pulses present in the output are allowed to pass and are thus detected by passage to the U trigger circuit described later.

(*b*) During beat S2 when the PI line of the control tube TB4 is read out to the *f* staticisor sections *f*13 to *f*19 by way of gates G67 and G66. Gate G67 provides an overriding negative voltage for manual control purposes when the section of the Auto-Man switch S8 is in its manual, i. e. negative form.

The output from the gate G66 is applied to each of a plurality of similar gates G68/13 to G68/19, each of which are controlled by a relative one of the series of waveforms MI0, MI1 . . . MI19 derived respectively from a further series of hand switches S7/0 . . . S7/19 between *p*13 and *p*19, i. e. the first gate G68/13 by the *p*13 *p*-Pulse, the second gate by the *p*14 *p*-Pulse and so on. When automatic operation is taking place, i. e. when the switch S6 is negative, the settings of switches S7/0 . . . S7/10 are irrelevant, and the waveform MIN is always negative and the pulse series *p*13 to *p*19 alone are effective to control the gates G68 for the purpose of comparison and selection of the appropriate digits in the incoming signal from the control tube.

For manual operation the required manual instruction is set up separately on the series of switches S7/0 . . . S7/19 and the switch S6 is reversed to apply a positive potential. Resetting of the *f*-static register sections occurs on the trailing edge of each A1 beat and this enables the *f*-static register sections to remain set up during the first two beats of the next instruction as will be necessary for the reasons already explained in the case of a 7 beat instruction.

(*c*) During the S1 and S2 beats when the C number and the actual instruction number respectively are fed by way of lead 112 to the *e* and *l*-static register sections (see Fig. 23*b*). During manual control the *f*-static registers are controlled not by the PI signal from the control unit but by the setting of the hand switches S7/0 . . . S7/19.

The arrangement of the B-tube unit BU is shown in Fig. 21. In broad principle, this device operates in the manner described in reference B to effect modification of the Present Instruction in the Control unit C. In the present machine, in addition to providing a total of eight B numbers, means are provided whereby any stored B number may be modified while in the B-store, whereby any B number may be returned to the main store S and whereby any one of the B-line contents may be tested.

A single storage tube TB5 is provided with a regenerative loop including read unit 96 and write unit 97. Inserted in this loop is an arithmetic unit AMU, possibly an adder but more conveniently a subtracting device as shown. Deflection of the tube beam in the line or X direction is effected by application of the XTB waveform (without lateral shift) to the tube X-plates. Address selection of the 8 available B words, each stored on a separate line is effected by the output BY-Plate waveform provided by the BY waveform generator BYWG which is constructed in a manner similar to that of the Y-shift generator of reference A and Fig. 29 of the present application but having only three current control valves T0, T1 and T2 to provide a progressively stepped waveform of 8 levels for effecting progressive regeneration of all addresses and with interposed intervals when the scanning level is determined by external control.

Input to the B store is by way of lead 103 from the main store S while the read output from the read unit 96, in addition to application to the arithmetic unit AMU, is also applied over lead 125 to the gate G42 of the control unit C (Fig. 20) and B inward transfer gate G15 and over lead 105 to the main store S. In addition the combined output from the arithmetic unit AMU, in addition to application to the write unit 97, is fed by way of gate G49 to the B-Sign flip-flop F14 whose function will be described later. An erase input to the read unit 96 causes erasure during the A2 beat of any operation under the s,B (Store to B-tube) code and also when the B-store clear key KBC is operated. The write unit 97 is arranged to be inhibited during beat A3 whenever one occurs and also during beat A2 for all codes other than B-codes (δ1δδ0δ1), otherwise information may be fed in at all times. Such inhibitive control is effected by application to the blackout valve of the write unit of the INV A3 waveform and the INV A2 waveform in combination with a code control signal.

The B tube addresses are defined by the three *b* digits of an instruction word as shown in diagram (*j*) Fig. 2, coincident in timing with the *p*10, *p*11 and *p*12 *p*-Pulses.

During the A1 beat the B-tube staticisor sections need to be set up as the Present Instruction is fed from the main store S to the PI line of the control unit C so that in the next, S2 beat, the appropriate B line content as ordered by the *b* digits of that instruction may be added to it to give the actual instruction which is to be obeyed. Setting of the B tube staticisors is again required to occur in this S2 beat from the *b* digits *p*10, *p*11 and *p*12 of the revised Present Instruction so that the correct B tube line may again be scanned during the subsequent A2 beat in those particular cases where the instruction being obeyed involves the transfer of B-tube instructions from the main store S into the B tube unit BU. Triggering of each of the *b* staticisor sections *b*10, *b*11 and *b*12 is effected by the leading edges of the S1 and S2 waveforms fed thereto by way of the buffer gate G143.

During the A1 beat and the S2 beat the static register sections *b*10, *b*11 and *b*12 are either reset or not reset according to the "1" or "0" significance of the related *p*10, *p*11 and *p*12 digits of the present instruction available through gate G128 on lead 113, selection being effected by the respective *p*10, *p*11 and *p*12 *p*-Pulses applied to gates G138/10, G138/11, G138/12 respectively in unison with the negative voltages of the MI10, MI11 and MI12 waveforms which are, under Auto operation conditions, continuously available from the manual key switches S7/10 . . . S7/12 of the series S7/0 . . . S7/19 (Fig. 20) as previously explained.

From the above it will be seen that in beat S2 it is necessary to use the B tube staticisor setting consequent on the previous beat A1 and to reset such staticisor simultaneously. This difficulty is overcome by applying each of the original, i. e. A1 beat, staticisor settings to a shuffle circuit (i. e. holding circuit including a valve with a control grid/cathode capacitor fed through clamping diodes as shown in connection with valve V2 of Fig. 32 of reference A) SHC/10, SHC/11, SHC/12 through gates G142/10, G142/11, G142/12 which are opened only during beat A1 so that such setting may be stored and fed out through gates G141/10, G141/11, G141/12 to the related control inputs of the waveform generator BYWG during the following S2 beat.

Except in beats S2 and A2 the B lines of the B tube are regenerated in turn in the usual way by application of the C1, C2 and C3 counter waveforms to the scanning generator applied through the separate gates G139/10, G139/11 and G139/12. In the S2 beat the counter circuits are inhibited at this gate G139 and the Y-deflection voltage is the particular setting in accordance with the delayed PI requirement derived from the shuffle circuits SHC/10—SHC/12 through the gates G141. During the following beat A2 the counter outputs are again inhibited and the revised Present Instruction B-digit staticisor setting is fed to the Y-plates by way of the gates G140.

Means are provided for testing the contents of the B tube as well as the A tube. Since there are eight lines on the B tube this would ordinarily involve eight different test codes. In general however it is only required to test the B tube immediately after it has been altered so that a single test code (Test B, s,C) derived in the usual way from the function (*f*) digits of the instruction, can be provided meaning that the last B number which was used is to be tested. For this purpose a B Sign trigger circuit F14 is provided. This trigger circuit is triggered by the *p*10 p-Pulse from gate G48 whenever a B number is used and is retriggered if the number on lead 109 shows a "1" digit at the *p*19 digit position. If retriggered the trigger circuit F14 removes the previous gate releasing potential for the Outward Transfer Gate G37 (Fig. 20) and accordingly prevents any transfer from the main store S to control unit C. The test A facility provided by the A Sign flip-flop F20 (Fig. 19) is arranged in similar manner and serves, if triggered, to remove the gate releasing potential from gate G37 (Fig. 20).

Figure 22:
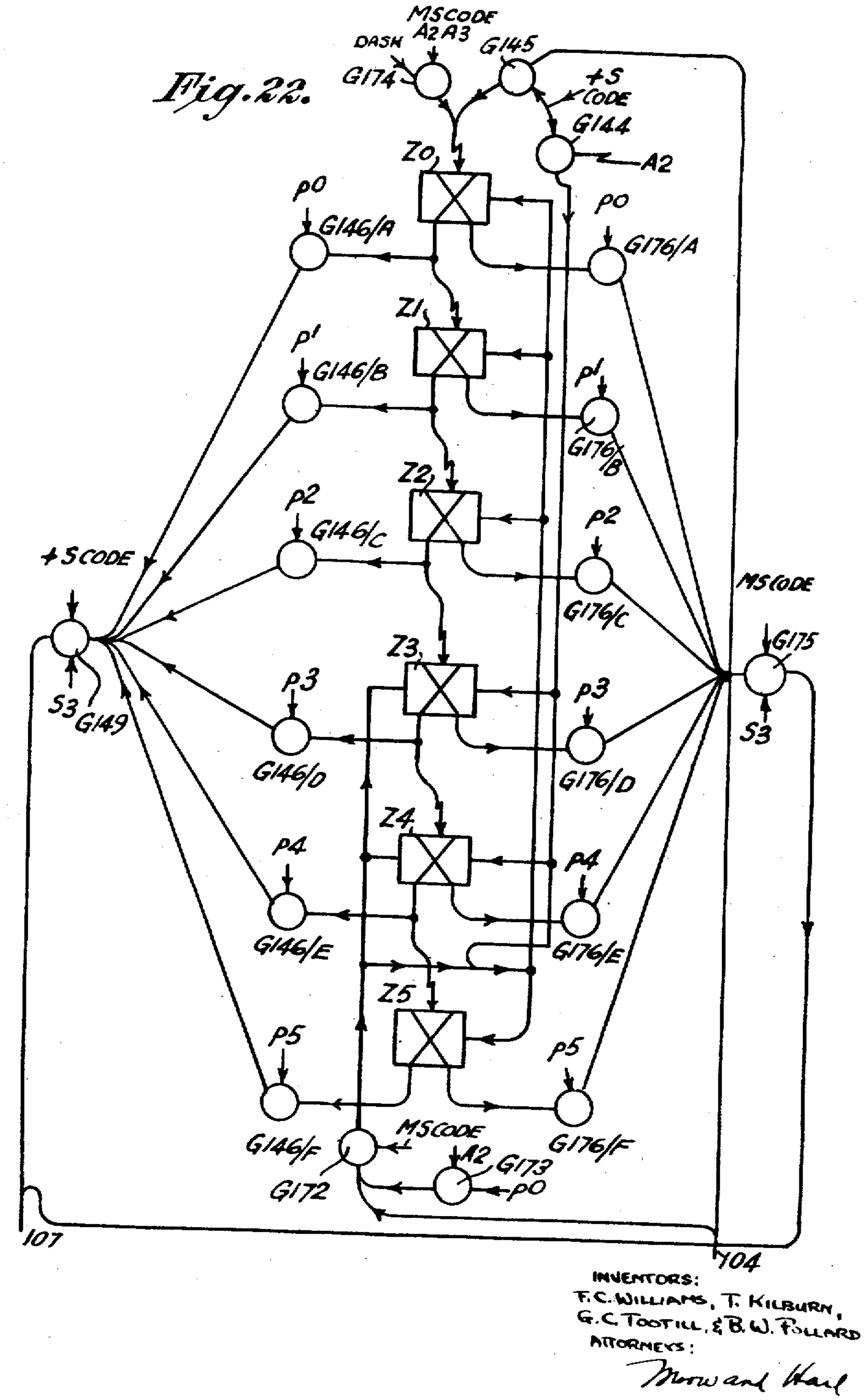
Fig. 22 is a schematic diagram of the arrangements for detecting the most significant digit and effecting sideways addition of the binary number digits.

Fig. 22 shows the arrangements provided for determination of the most significant digit in any number available in the main store and also for effecting sideways addition of the various binary "1" digits so as to extract the digital of a number as required for certain logical and number theory problems.

In the determination of the most significant digit the operation is to detect *m* where $2^m \leqq Sn+2^{20}Sn+1<2^m+1$ and Sn denotes the contents of storage location *n*.

The various counter-connected trigger circuits Z0, Z1 . . . Z5 are employed, those of Z3 and Z4 being triggered and the remaining counters Z0, Z1, Z2 and Z5 being reset by the *p*0 p-Pulse at the instant of commencement of the A2 beat following the signalling by the *f* static register sections of unit STU through a code control circuit of the MS (most significant digit) code (δ001000). Such triggering is effected by the passage of the *p*0 *p*-Pulse through gates G173 and G172. As a result of this operation the number 000110 (24) is set up on the counter chain. During the ensuing A2 and A3 beats following such MS code, Dash pulses are added to the counter chain through the gate G174 and will cause stepping-on of its setting beyond 000110. The number under test is, however, simultaneously applied at Gate G172 from lead 104 and every "1" digit of such number will pass through gate G172 to cause resetting of the counter configuration back to the previous (24) condition so that only after the last "1" digit of the number under test has been received does the addition of Dash pulses through the gate G174 have any significance. Addition of "1's" then continues until the end of beat A3. The number added in through the gate G174 is therefore $39-m$. The counter, however, was originally set to 24 so that the direct counter setting will now provide the number $(39-m)+24=63-m$. The output from the counter chain is taken to the accumulator by way of lead 107 through the six separate gates G176A . . . G176F and comomn gate G175 during beat S3 and is from the reverse side of the counters of the counter chain; the reverse counter output thereby provides the complement of the direct counter setting $-1$, that is to say, in this case $2^6-(63-m)-1=m$ which is the required number.

The same circuit elements may be used to extract the digital of a number, e. g. the digital of 101110 which is 1+1+1+1 or in binary notation 001 (read from left to right). The counters Z0 to Z5 are arranged to be reset at the beginning of beat A2 of the operation +S for the +S (sideways addition) code (001010) derived, in the usual way, via a code control circuit from the *f* static register sections of unit STU, resetting being effected through gate G144. Subsequently during the A2 and A3 beats the number to be operated upon is fed over lead 104 from the main store S into the counter chain through gate G145 so that the final setting of the chain will give the required digital. Output is taken from the counters to the accumultor by way of the six gates G146A . . . G146F and gate G149 during the S3 beat, the related *p*-Pulses applied to the gates G146A to G146F serving to release the particular settings of the trigger circuits at the appropriate instants to reform their settings into a binary code signal which is fed by lead 107 to the accumulator A. During beats S3 and S4 the gate G106 of the accumulator direct regeneration loop (see Fig. 19) is closed by the application of the inverse +S waveform and the accumulator adder ADR is conditioned to receive the output from the gate G149. Use of the beat B4 is necessary since addition to any existing contents of the accumulator may involve a carry-over.

The subsidiary magnetic storage device W is shown in Figs. 23*a*, 23*b* and comprises a rotatable recording drum MDR driven by an electric motor EDM and synchronised in its running with the raster scanning action of the beams of the cathode ray tubes of the main store S as described in detail in U. S. Patent No. 652,554, granted September 13, 1953, to F. C. Williams et al. This drum MDR co-operates with pairs of magnetic writing and reading heads MWH and MRH, one pair for each circumferential recording track on the drum and of which there are conveniently 256. Each recording track is arranged to store 1280 digits around its complete circumferential path and, in the present machine utilising storage tubes each with a capacity of 64 lines of 20 digits each, represents a total of one cathode ray tube filling on each drum storage track. Only one storage track of the magnetic store is effective, either for writing or reading, at any one time and the necessary selection of this track is effected, so far as writing in is concerned, by the settings of the relays in the relay track RT adapted to provide selective connection between the magnetic writing unit MWU and any chosen one of the writing heads MWH. The setting of these relays is controlled by magnetic track or T-static register sections T0, T1 . . . T7 each of which comprises a two-stable-state trigger circuit similar in form to those of the *l*, *e*, *b* and *f* static register sections already referred to.

The triggering of each T static register section is effected by certain digits of a special Magnetic Transfer Instruction word of which an example is given in diagram (*k*), Fig. 2. This word, like a normal Instruction word, is of 20 digits length and has its digit positions allocated as follows:

T Digit positions *p*0 . . . *p*7 for specifying the track number on the drum MDR which is to be concerned with the transfer.

F Digit positions *p*10 . . . *p*14 for specifying the type of operation to be performed, e. g., writing into magnetic store, reading out, check and so on.

E Digit positions *p*16 . . . *p*19 for specifying which storage tube or tubes of the main store S are to be involved.

The digit positions *p*8, *p*9 and *p*15 are spare for extension if necessary.

Such Magnetic Transfer Instruction word may be derived from the main store S from which it is read out in beat A2 in the manner of a number word following the immediately preceding Normal Instruction word which initiated the transfer. Alternatively it may be derived from a setting of the hand switches K0 . . . K19 of the main store S in similar manner to the writing-in to the main store by such switches. In the former case the signal train expressing the Transfer Instruction word is fed in over lead 121, through the Magnetic Outward Transfer Gate G25, buffer G116 and pulse selecting gates G11/0 to G11/7, controlled respectively by the *p*0–*p*7 *p*-Pulses, to the T static register sections T0–T7, through similar gates G11/10 . . . G11/14 to the F static register sections F10 . . . F14 and through gates G11/16 . . . G11/19 to the E static register sections E16 . . . E19. In the other, hand switch case, the equivalent train is supplied over lead 119 and gate G26 to the buffer G116 and thence to the static register sections as before. Gates G25 and G26 are each opened in beat A2, the former only when the seven *f* digits of pulse positions *p*13 . . . *p*19 of the initial Present Instruction carries the code *s*,*W* (Store to Magnetic Store) and the latter under the code *h*,W (Hand to Magnetic Store) from the same *f* digits of the instruction. Fig. 2(*k*) illustrates a representative magnetic instruction.

The reading heads MRH are similarly associated with an individual preamplifier valve in the amplifier MRA, the operation of any one of these valves to co-operate with a chosen recording track being controlled by appropriate gating of the remaining valves, e. g. by suppressor grid gating and this gating is again controlled by the setting of the T-static register sections T0 . . . T7. The T-static register sections by appropriate setting following the presentation thereto of a particular sequence of T digits within the Magnetic Transfer Instruction word, will therefore cause the setting up for operation of both the writing head and also the reading head for any one chosen track out of the number of tracks available.

The arrangement of the present machine is such that transference of either a complete block of 32 words constituting one column or page of the cathode-ray-tube storage devices of the main store S or two blocks of 32 numbers constituting two columns or pages of such storage devices may be read out of the magnetic store W and written into the main store S, or vice-versa, automatically.

The transfer operations may be of eight basically different kinds as follows.

(*i*) One half (half 0) of a record track into an odd or even page of a cathode-ray-tube store.

(*ii*) An odd or even page of a tube store into one half (half 0) of a track.

(*iii*) The other half (half 1) of a track into an odd or even page of a store.

(*iv*) An odd or even page of a store into the other half (half 1) of a track.

(*v*) Half 0 of a track and half 1 of the same track into an even page of one store and the odd page of the next store respectively.

(*vi*) An even page of one store and the odd page of the next store into halves 0 and 1 respectively of a track.

(*vii*) Half 0 of a track and half 1 of the same track into an odd page of a store and the even page of the previous store respectively.

(*viii*) An odd page of one store and the even page of the preceding store into halves 0 and 1 respectively of a track.

Provision is made for effecting a check on each of these eight different types of transfer so that a total of sixteen separate magnetic transfer instructions are required, and are defined by the combination of F digits in the Magnetic Transfer Instruction.

The time taken to effect magnetic transference clearly occupies a very much longer period than that of any one complete bar of the machine cycle and arrangements have to be made for the suspension of normal operation of the machine while transfers are taking place. Furthermore the relatively slow action due to the mechanical form of the relays in the relay tree RT necessitates the inclusion of a further lengthy delay between the instant of operation of these relays and the subsequent supply of writing signals therethrough to the recording heads. A similar but much smaller delay is desirable in the case of reading out of the magnetic store to ensure proper completion of the selection operation performed by the read head amplifier RHA.

For the purpose of effecting a proper co-ordination between the magnetic store W and the main store S the magnetic drum MDR is provided with a special address track ADT upon which are permanently recorded the individual addresses, in binary code form suitable for the *l*-static register sections *l*0 . . . *l*5 Fig. 23(*b*), representative of the particular cathode ray tube line portions which are currently under the writing or reading heads. Furthermore, arrangements are made during transfer whereby the scan beat of the main store is eliminated so that each beat is an action beat. In this way the various address numbers read out over the separate address track may be fed direct to the *l*-static register immediately prior to the commencement of transfer of the next stored line so as to set up in the main store S the appropriate Y-Shift to the proper chosen address for the new data item to be transferred.

This is arranged by connecting the *l* or line static register sections l0 . . . l5 also as a binary counter in the manner shown in Fig. 23*b* whereby the various trigger circuits, in addition to being set through the coincidence gates G72/*a* . . . G72/*f* as in the earlier arrangements described, are also arranged to trigger one another serially. Thus the *l*-static register sections, on information received from the address track ADT, set themselves up automatically line by line as the material is read out of or into the magnetic store W.

In effecting a magnetic transfer a further operation is necessary, namely that of timing the transfer so as to allow the information to flow to or from the magnetic drum MDR for a period precisely embracing the required one half or whole of the drum recording track length.

The principal waveforms used in connection with magnetic transfers are those of the J waveform, the G waveform, the T AWF (Transfer Action) waveform and the MDI (Magnetic Decoder Inhibit) waveform.

As seen in diagram (*j*), Fig. 4, the J waveform is negative during the waiting period from the end of beat A2 whereas the G waveform of diagram (*k*), Fig. 4, is negative during the transfer period, the inverse versions of these waveforms being the exact opposites. The MDI waveform is negative throughout. The T AWF waveform is negative during the whole of the transfer period for those transfers in which a full track is involved but only during the appropriate part of the transfer period whenever a half track transfer is being made. The generation of these and other waveforms will be described later.

The measurement of the two waiting periods is effected with the aid of the PI line on the control unit C which is not required for other purposes during magnetic transfers in view of the suspension of the normal 4 or 5/7 beat rhythm during transfer, and which is used as a counter for timing both the initial waiting delay period and the actual transfer period itself.

The PI line of the control tube TB4 (Fig. 20) is arranged to be scanned continually during this period by the application of the J or G waveform, diagrams (*j*) or (*k*), Fig. 4, in the buffer gate G124 (Fig. 20). It is also arranged that "1" will be added to the PI line of the control tube TB4 during each beat by application of the *p*0 *p*-Pulse through gate G52, which is opened by the J waveform fed through gate G50 after the end of beat S3. The counting is effected by either placing the binary number for 120 on the PI line in the manner already described in connection with the operation of the control tube or by placing the number 0 on the PI line by erasure of the previous number. In either case the number 128 will eventually be signalled by the change of condition of the output signal at the *p*7 digit position, i. e. coincident with the *p*7 pulse, such change occurring after 8 beats in the case where 120 is first placed on the PI line and after 128 beats in the case where 0 is first placed on the PI line.

The existence of this "1" digit at the *p*7 digit position is detected by means of the gate G62 (Fig. 26) which is fed with the output from the control tube over lead 124. The gate G62 is influenced by the J or G waveforms and the INV A3 waveform as well as the *p*7 *p*-Pulse. In consequence this gate is opened only during the *p*7 *p*-Pulse interval during the existence of a magnetic transfer instruction so that immediately the "1" digit pulse appears it is passed to the U trigger circuit F22 which provides on its alternative outputs the U and the INV U waveforms. The U waveform is shown in diagram (*l*), Fig. 4. The point of triggering of this circuit F22 marks the initiation of the actual transfer operation.

It is not necessary to wait until the beginning of specified track arises under the related writing or reading head before commencing transfers. A transfer can be started at any point of the track immediately the necessary delay has been provided.

The provision of the waiting period is effected as follows.

(*i*) In beat A2 of the normal operation in which the Present Instruction being dealt with in the electronic section of the machine calls for a magnetic transfer, i. e. (*s*,W) or (*h*,W), the MDI trigger circuit F21 (Fig. 23*a*) is triggered by the *p*19 *p*-Pulse passed through the gate G89 which is subjected to the "1"-representing output of the F-staticisor section F14 (then in its "0" condition) and the A2 waveform under the specified instruction word conditions. By the use of the F14 staticisor section it can be ensured that the MDI trigger circuit is not set up for certain other instructions of the machine which may also make use of the F and other staticisor sections employed with the magnetic recording mechanism. The *p*19 *p*-Pulse is employed to ensure that the staticisor section F14 has had sufficient time to become set up before its inhibiting waveform is required.

At the commencement of the next beat A3, the trigger circuit F24 (Fig. 25) is triggered because of the presence of the MDI waveform at gate G69. This trigger circuit provides the J and the INV J waveforms already referred to. Prepulses are automatically inhibited after this circuit has been operated by the application to gate G4 (Fig. 11) of the INV J waveform. By this means the possibility of further prepulses is inhibited until the end of the delay period when the task of still further inhibiting prepulses at the same gate G4 is taken over by the INV G waveform in a manner described later, to cover the next following or transfer period with the result that the MDI trigger circuit F21 remains in its triggered condition until the transfer is completed and the leading edge of the S1 waveform of the operation following the next Prepulse effects its resetting.

The MDI waveform is used to control the writing and reading head trees MWH and MRA and the gate controlling the cross transfers between the E-staticisor sections and the *e*-Staticisor sections and so on.

The PI line of the tube TB4 of control unit C is erased during the S3 beat by the presence of MDI waveform on the gate G56 (Fig. 20) and the number 120, i. e. 128—8, is inserted thereon through the buffer G45 and gate G44 for those F-Staticisor codes which do not involve writing into the magnetic store. This number is obtained by appropriate combination at the buffer G45 of the *p*3, *p*4, *p*5 and *p*6 *p*-Pulses. The control tube Y-shift is constrained to keep on the PI line by the presence of the J waveform at buffer G124 and the PI line thenceforth operates as a counter, successive *p*0 pulses being fed to the adder unit 59 of the counter by way of the gate G52. The addition of *p*0 is inhibited during the S3 beat during which either 0 or 120 is written into the PI line by the withholding of the J waveform fed through gate G50.

During the waiting period the J waveform is available and the G waveform is not, so that the magnetic drum address track output from the read unit ATRU is fed over lead 200 to the *l*-static register sections l0 . . . l6 and to a V trigger circuit F25 by way of the common gate G80 and individual control gates G72/A . . . G72/f, G78 and G86.

The *l*-static register sections comprise a two-stable-state trigger circuit and the group l0 . . . l5 are arranged as a counting chain with a common triggering input terminal of the next following stage connected to one of the outputs of the previous stage whereby each input pulse to the first stage successively advances the count condition of the static register group by one step. Provision is made to reset all of the static register trigger circuits l0 . . . l5 and the V trigger circuit F25 into their untriggered state by the application of a common resetting pulse on the lead 204 and derived from a shuffle or delay action circuit 205 which is triggered by any one of a variety of inputs including the S1 waveform, the S2 waveform and the *p*21 *p*-Pulse provided the gate G65 is opened by the simultaneous presence of the J waveform and the INV U waveform. The triggering of each of the separate trigger circuits *l*0 . . . *l*5 and the circuit F25 is effected by way of the various gates G72A to G72F which are respectively supplied with *p*0 to *p*5 *p*-Pulses and with the related manual operation equivalents $MI_0$ . . . $MI_5$ from the hand switches S7 (Fig. 20). The V trigger circuit F25 triggering input is controlled in gate G86 by the *p*6 *p*-Pulse and the MI6 output.

During the waiting period the *l*-staticisor sections *l*0 . . . *l*5 and the B trigger circuit F25 are being continually reset at the end of each beat by the *p*21 *p*-Pulses fed through Gate G65 and the shuffle or delay-action circuit 205. At the same time the address track number (in which the digit positions *p*0 . . . *p*5 define the line number and the *p*6 digit positions, by "0" or "1" the track half even or odd) arriving on lead 200 is being continually applied to the same trigger circuits as a triggering medium through the pulse selecting gates G72A . . . G72F and G86 with the result that these staticisor sections are repeatedly set up with the address track number and the V trigger circuit F25 with the track-half identification 0 or 1 as delivered from the drum MDR and which, is arranged to be the proper address in the main store S of the immediately approaching line portion of any of the actual storage tracks.

This process continues until the G trigger circuit F23 (Fig. 27) is triggered at the end of the waiting period, by the negative-going step in the U waveform as previously described.

Each time a *p*7 digit pulse, which is used on the address track ADT to indicate the end of the last line recording section on the tracks, is present in the read-out signal through gate G80, the static register section *l*6 is triggered and is then reset by the following BO waveform. This causes "1" to be added to the setting of the V trigger circuit F25.

In order to prevent the Y-deflection of the main store S, which is controlled by the *l*-static register sections *l*0 . . . *l*4 through the Y-plate waveform generator YSG and the associated gates G29/0 . . . G29/4, as previously described, from changing in the middle of an action beat, the setting of the *l*-static register sections from the address track ADT as above described is purposely inhibited during the first beat of the J waveform by the application of INV A3 waveform to the address track reading unit ATRU.

The "shuffle" circuit 205 associated with the resetting pulses applied to the counter-connected chain of the *l*-static register sections is of known form as already referred to in connection with Fig. 21 and is a type of circuit which provides a lengthened pulse from the instant of triggering to the instant of resetting and in this case provides a pulse whose duration is extended to cover the whole of the Blackout period following triggering by use of the positive-going rear edge of the Blackout pulse as the resetting medium. The extended duration of the resetting pulse applied to the counter-connected trigger circuits avoids any possible difficulty in the reliability of resetting due to the delay which unavoidably occurs in the changeover action of the later units of the *l*-static register due to inherent delay of operation which takes place in each and which is cumulative with the counter-connected train as shown.

In the meantime during the S3 beat of the waiting period, the output of the E-static register sections E16 . . . E19 upon which the Magnetic Transfer Instruction was initially set up, is transferred by way of the gate G93 and the three further gates G92*a*, G92*b* and G92*c* to the *e*-static register units, *e*6, *e*7, *e*8 and *e*9, respectively. These *e*-static register units are those which control tube selection in the main store S and have previously been reset from a previous condition by the differentiated leading edge of the S3 waveform which is passed through the gate G94 which is opened only during the presence of the F-static register codes for the instructions of (*s*,W) or (*h*,W) previously referred to.

The waiting period of either 128 or 8 beats, according to whether the transfer is inwards to or outwards from the magnetic store, is ended when the PI line of the control unit storage tube TB4 contains the number 128, i. e. 0000001, when a pulse in the *p*7 timing position is presented to the gate G62 in coincidence with the controlling *p*7 *p*-Pulse, the gate being otherwise opened by the J waveform and the INV A3 waveforms. Under this condition, but only under this condition, is a pulse passed from the gate to the trigger circuit F22 whose function is to generate the U waveform.

The comparison of the *p*7 digit pulse of each number read out from the control tube TB4 to the gate G62 takes place continuously during the period of both J and G waveforms. It is, however, necessary to inhibit this comparison during beat A3 of the transfer operation, i. e. the first beat during which the J waveform is negative, in order to avoid comparison with any irrelevant information which may then be existent in the control tube. The actual comparison is, therefore, started in beat S3 of the transfer operation and the gate G62 will finally pass the *p*7 pulse from the read-out signal in the beat in which 128 in binary form first appears on the PI line.

The control tube goes on counting during the next following transfer period and a pulse will be present in the *p*7 digit position of the read-out signal at every occurrence until the number standing on the PI line of the control tube reaches 256 when the *p*7 digit position will refer to the "0" state and the *p*8 digit position will assume the "1" condition. In consequence of this presence of a *p*7 digit pulse in each readout signal from the control tube between beats 128 and 256 the trigger circuit F22 will be continually triggered since it is continuously reset at the beginning of each beat by the *p*0 *p*-Pulse. Continuous triggering resetting of the circuit F22 therefore characterises the actual tranfer period of the magnetic transfer operation as may be seen from diagram (*l*) Fig. 4.

During the period of actual transfer, in the *p*20 digit pulse timing position after the trigger circuit F22 is first triggered, the trigger circuit F23 which generates the G waveform is triggered through the gate G63 since the circuit F22 is always in a triggered condition at the instant of the *p*20 *p*-Pulse of any beat. The trigger circuit F24 (Fig. 25) generating the J waveform is reset at the instant of the *p*18 *p*-Pulse following the triggering of the G trigger circuit F23 by way of the gate G70 which is controlled by the G waveform so that the trigger circuits F24 and F23 which generate the J and G waveforms respectively overlap from the instant *p*20 of one beat to the instant *p*18 of the next beat. This is to enable the control of the various gate circuits such as those of G62, G52 and G4, to be transferred from the influence of the J waveform to the G waveform at the changeover point without even momentary interruption.

As soon as the G trigger circuit F23 is triggered, the gate G80 through which the address track output passes, is immediately closed and the *l*-static register sections are cut off from the address track read output. The INV U waveform at gate G65 similarly causes closure of the latter to interrupt the supply of *p*21 *p*-Pulses which have effected resetting of the *l*-static register sections *l*0 . . . *l*5 at each beat. The *l*-static sections thereupon immediately commence to function as a counter chain starting from the last number set up thereon, i. e., the address track number from the magnetic drum at which they stood at the instant of commencement of the actual transfer period.

During each following beat, *p*21 is injected to the first trigger circuit *l*0 of the *l*-static register chain by way of the gate G74 which is now opened by the G waveform, so that from this point the various lines of the specified tube of the main store S are scanned consecutively in step with the magnetic drum.

The length of the transfer period is actually 130 beats, the *l*-static register counter chain being restrained by means of the additional control on the gate G74 which is afforded through the trigger circuit F38. The latter, normally in its retriggered condition by continual application of the *p*0 *p*-Pulse, is triggered by the *p*18 p-Pulse through gate G73 when the latter is opened by the application thereto of the output from the static register section *l*6. Triggering of the static register section *l*6 through gate G178 occurs at the end of the 64th address line to be scanned in the main store S. The circuit F38 is therefore triggered, the gate G74 is closed and the *p*21 *p*-Pulses required for stepping on the counter chain of the *l*-static register sections are inhibited. Simultaneously the application of INV *l*6 waveform from the circuit *l*6 at the gate G52 of the control unit C (Fig. 20) closes that gate and simultaneously inhibits the addition of *p*0 *p*-Pulses to the PI line of the control tube TB4.

Only during the transfer period is the trigger circuit *l*6 triggered by the carry-over from the static register section *l*5 since the coupling connection is through the gate G178 which is controlled by the G waveform. This inhibition avoids carry over difficulties due to the counter connections of the *l*-static register sections.

The end of the transfer period is marked by the appearance of 256 in the PI line of the control tube TB4 and as at this point a digit at the *p*7 digit position of the output signal is absent for the first time since the occurrence of the number 128, the gate G62 is closed and the U trigger circuit F22 remains in the reset condition following resetting by the *p*0 *p*-Pulse. At the *p*20 position of the following beat the trigger circuit F23 governing the G waveform is also reset and the transfer is at an end. Finally the *l*-static register sections and the trigger circuit F25 governing the generation of the V waveforms are all reset by the following Blackout pulse acting upon the now active shuffle circuit 205.

In the case of transfers in which the whole of the 64 line content of a track on the recording drum MDR is to be transferred to or from the main store S the F-static register section F11 is presented with a "1" digit by the Magnetic Instruction and in consequence the T AWF waveform generated in the gate G71 (Fig. 24) is identical with the G waveform. For half-track transfers, however, it is necessary to effect transference for only half of that time period in which the G waveform is negative-going. This is implemented by the application, in addition to the output from the static register section F11, of the INV V waveform to the gate G71.

The trigger circuit F25 which generates the V waveform, governs the setting of the trigger circuit *e*6 of the *e* or tube selection static register sections in such a manner that, in the case of double or full-track transfers, the two specified pages 0 and 1 of the main electrostatic store are scanned in the correct order. In the case of a half-track transfer the static register section F11 is always at its "0" condition because of the nature of the transfer instruction digits concerned and the setting of the trigger circuit F25 has no effect upon the static register section *e*6 in view of the inhibition of the gates G84 and G85 which are in the controlling path from each output of the circuit F25. The original setting of the circuit F25 is effected by way of gate G86 and by the *p*6 digit position signal pulse in the address track read output which indicates the half-track which is being scanned at any time. As will be seen later this ensures that the appropriate half track is transferred to the appropriate tube.

In order that it may be possible to carry out both "straight" and "cross-over" transfers it is arranged, in the case of an order for a "cross-over" transfer, that the *p*12 *p*-Pulse is added by way of gate G87 to the setting impulses applied to the V trigger circuit F25 when the F-static register section F10 is presented with a "1" digit in the Magnetic Instruction. This causes a reversal of the V trigger circuit F25 from what would otherwise have been its final condition whereby the order of scanning of the tubes will be reversed and the T AWF waveform will also be reversed. It will thus be seen that the lag between the triggering of the circuits F22 and F23, i. e. from the *p*7 instant to the *p*20 instant enables the *p*12 p-Pulse to be added to the V waveform generating circuit F25 if required before the trigger circuit F23 of the G waveform generator is changed over to commence transfer.

As an example the case of a "cross-over" transfer where a specified half-track number T*n* is required to be transferred to the latter of two tube pages, *Pm*+1, and the second half-track number *Tn*+1 is required to be transferred to the earlier of the two pages P*m*, will be considered. It will be assumed that at the end of the waiting period the earlier half track 0 is being scanned by the write and read heads MWH and MRH. The last *p*6 digit from the address track read output is accordingly a "0" and the trigger circuit F25 is not affected and remains in its reset condition following reset by *p*21 *p*-Pulse through shuffle circuit 205. Since this is a "cross-over" transfer, however, the immediately following *p*12 pulse is added to the trigger circuit F25 through the gate G87 which is already opened by the condition of the F10 static register unit in its "1" representing state and the application of the INV G waveform to the gate. This will cause triggering of circuit F25 and this in turn will cause the static register unit *e*6 to be constrained to its triggered position through the gates G84 and G85 which are opened by the application of the output from F11 which is under the condition "1" for a double transfer. The transfer will start immediately since the F11 input to the gate G71 will make the early part of the TAWF waveform coincide with the G waveform and the first part of the transfer will accordingly be between the half-track "0" and the odd tube specified. The *p*7 digit position signalling pulse, the arrival under the address reading head of the end of the half-track "0" triggers the static register section *l*6 by way of the gate G78 and the subsequent resetting of this circuit by the Blackout pulse causes the trigger circuit F25 and with it the static register section *e*6 to change over. The second part of the transfer then takes place between the half track "1" of the drum and the even tube which is specified. At the end of this half track "1" the following *p*7 pulse from the address track read output again causes both circuits F25 and *e*6 to reverse and the final part of the transfer takes place between the remaining part of the half track "0" and the odd tube as in the initial part of the transfer.

The other elements of Fig. 23*a*, including the comparison circuit COMP and trigger circuits F36 and F37 are concerned with a checking arrangement by which a magnetic store record can be compared with one in the main store S and action taken to indicate any difference, such as by providing an audible warning and/or stopping the machine. Since such arrangements are not directly concerned with the present invention they will not be described in detail but the manner of operation can be seen by suitable interpretation of the symbols and applied waveforms.

A large number of consecutive transfers from the magnetic storage device W can, with the system outlined, cause serious difficulty owing to lack of proper regeneration. On the other hand transfers to the store are satisfactorily provided for since each tube is regenerated twice during the 128 beat waiting period. In the particular half-track transfer cases noted above there are 64 beats during the transfer period when no transfer is occurring. Use is made of these quiescent beats so that all stores may regenerate completely during each transfer. This is achieved by the modifying influence of the TAWF waveform in the generation of the SAWF waveform (see Figs. 14 and 24) which controls the write units 33 of the main store tubes TB1 . . . TB16.

Various modifications both of apparatus arrangement and construction or the machine organisation may obviously be made without departing from the scope of the invention. For example the initial loading of information into the storage devices and the discharge of information from the machine may be effected with the aid of any suitable input/output device, e. g. employing perforated tape, punched cards and so on. Other modifications include the use of the same cathode ray storage tube for the accumulator, and the B-tube and the same arithmetic unit, such as an adder, for both accumulator and B-tubes or for both control and B-tubes. Alternatively several accumulators can be accommodated on a single storage tube. In a modification of the address track arrangement on the magnetic drum each address record for each line-filling item is disposed to be read out within the separating Blackout intervals. With such an arrangement the *l* static register sections can be set up continuously from the address track even when actual transfer is proceeding.

We claim:

1. An electronic digital computing machine comprising a main data store having a plurality of unique address locations each capable of holding a single number signal or instruction signal, a computing device, signal transfer channels including signal-controlled switching means between said main data store and said computing device and a control unit providing machine-operation control signals including switch-controlling signals for controlling said signal-controlled switching means under the control of a currently effective instruction signal fed thereto, said control unit including an instruction signal storage device for retaining the currently effective instruction signal therein, said instruction signal storage device including a first stored-signal modifying means having a first modifier signal input for modifying the currently effective instruction signal while stored in said storage device in accordance with the form of an instruction-modifying signal applied to said first modifier signal input, a separate instruction-modifying signal storage means having a signal output and including a second stored-signal modifying means having a second modifier signal input for altering an instruction-modifying signal held in such storage means in accordance with the form of an altering signal applied to said second modifier signal input and circuit means connecting said signal output of said instruction-modifying signal storage means to said first modifier signal input of said first stored signal modifying means of said instruction signal storage device whereby any instruction-modifying signal held in said instruction-modifying signal storage means may itself be altered before application to said first stored signal modifying means.

2. An electronic digital computing machine comprising a main data store having a plurality of unique address locations each capable of holding a single number signal or instruction signal, an accumulator device, signal transfer channels including signal-controlled switching means between said main store and said accumulator and a control unit providing machine-operation control signals including switch-controlling signals for controlling said signal-controlled switching means under the control of a currently effective instruction signal fed thereto, said control unit including an instruction signal storage device for retaining the currently effective instruction signal therein, said instruction signal storage device including an arithmetical unit having a modifier signal input for modifying the currently effective instruction signal while stored in said storage device by combining the stored currently effective instruction signal with an instruction-modifying signal applied to said modifier signal input, a separate instruction-modifying signal storage means having a signal output and including a stored signal modifying means having a second modifier signal input for altering an instruction-modifying signal held in such storage means in accordance with the form of an altering signal applied to said second modifier signal input and circuit means connecting said signal output of said instruction-modifying signal storage means to said modifier signal input of said arithmetical unit of said instruction signal storage device whereby any instruction-modifying signal held in said instruction-modifying signal storage means may itself be altered before application to said arithmetical unit.

3. An electronic digital computing machine comprising a main data store having a plurality of unique address locations each capable of holding a single number signal or instruction signal, an accumulator, signal transfer channels including signal-controlled switching means between said main store and said accumulator and a control unit providing machine-operation control signals including switch-controlling signals for controlling said signal-controlled switching means under the control of a currently effective instruction signal fed thereto, said control unit including an instruction signal storage device for retaining the currently effective instruction signal therein, said instruction signal storage device including a first stored-signal modifying device having a first modifier signal input for modifying the currently effective instruction signal while stored in said storage device in accordance with the form of an instruction-modifying signal applied to said first modifier signal input, a separate instruction-modifying signal storage means having a signal output and including a second stored-signal modifying device having a second modifier signal input and comprising an arithmetic unit for altering an instruction-modifying signal held in such storage means by combining the instruction-modifying signal stored therein with an altering signal applied to said second modifier signal input and circuit means connecting said signal output of said instruction-modifying signal storage means to said first modifier signal input of said first signal modifying device whereby any instruction-modifying signal may itself be altered before application as a modifying medium in said control unit.

4. An electronic digital computing machine comprising a main data store having a plurality of unique address locations each capable of holding a single number signal or instruction signal, an accumulator, signal transfer channels including signal-controlled switching means between said main store and said accumulator and a control unit providing machine-operation control signals including switch-controlling signals for controlling said signal-controlled switching means under the control of a currently effective instruction signal fed thereto, said control unit including an instruction signal storage device for retaining the currently effective instruction signal therein, said instruction signal storage device including a first stored-signal modifying means having a first modifier signal input for modifying the currently effective instruction signal while stored in said storage device in accordance with the form of an instruction-modifying signal applied to said first modifier signal input, a separate instruction-modifying signal storage means having a signal output and including a second stored signal modifying device comprising and adding device having a second modifier signal input for altering an instruction-modifying signal held in such storage means by the addition of said stored instruction-modifying signal to an altering signal applied to said second modifier signal input and circuit means connecting said signal output of said instruction-modifying signal storage means to said first modifier signal input of said first stored-signal modifying means whereby any instruction-modifying signal may itself be altered before application as a modifying medium in said control unit.

5. An electronic digital computing machine comprising a main data store having a plurality of unique address locations each capable of holding a single number signal or instruction signal, an accumulator, signal transfer channels including signal-controlled switching means between said main store and said accumulator and a control unit providing machine-operation control signals including switch-controlling signals for controlling said signal-controlled switching means under the control of a currently effective instruction signal fed thereto, said control unit including an instruction signal storage device for retaining the currently effective instruction signal therein, said instruction signal storage device including a first stored-signal modifying means having a first modifier signal input for modifying the currently effective instruction signal while stored in said storage device in accordance with the form of an instruction-modifying signal applied to said first modifier signal input, a separate instruction-modifying signal storage means having a signal output and including a second stored signal modifying device comprising a substracting device having a second modifier signal input for altering an instruction-modifying signal held in such storage means by the subtraction therefrom of an altering signal applied to said second modifier signal input and circuit means connecting said signal output of said instruction modifying signal storage means to said first modifier signal input of said first stored signal modifying means whereby any instruction-modifying signal may itself be altered before application as a modifying medium in said control unit.

6. An electronic digital computing machine comprising a main data store having a plurality of unique address locations each capable of holding a single number signal or instruction signal, an accumulator, signal transfer channels including signal controlled switching means between said main store and said accumulator, a control unit providing machine-operation control signals including switch-controlling signals for controlling said signal controlled switching means under the control of an instruction signal fed thereto, said control unit including an instruction signal storage device for retaining the current instruction signal therein and means interconnected with said storage device for modifying the current instruction signal while stored therein in accordance with the form of an applied instruction-modifying signal, a separate instruction-modifying signal storage device of the cathode ray tube type having a regenerative loop which includes an interconnected arithmetic unit for altering an instruction-modifying signal held in such storage means by combining the stored instruction-modifying signal with an applied altering signal and circuit means connecting said instruction-modifying signal storage means to said modifying means of said instruction signal storage device of said control unit whereby any instruction-modifying signal may itself be altered before application as a modifying medium in said control unit.

7. An electronic digital computing machine comprising a main data store having a plurality of unique address locations each capable of holding a single number signal or instruction signal, an accumulator, signal transfer channels including signal-controlled switching means between said main store and said accumulator and a control unit providing machine-operation control signals including switch-controlling signals for controlling said signal-controlled switching means and an instruction modification control signal under the control of a currently effective instruction signal fed thereto, said control unit including an instruction signal storage device for retaining the currently effective instruction signal therein, said instruction signal storage device including a first stored signal modifying means having a first modifier signal input for modifying the currently effective instruction signal while stored in said storage device in accordance with the form of an instruction-modifying signal applied to said first modifier signal input, a separate instruction-modifying signal storage means having a plurality of unique address locations each capable of storing a single instruction modifying signal, a signal output and address selecting means for making a chosen one of said unique address locations available at said signal output under the control of said instruction-modification control signal, circuit means for applying said instruction modification control signal to said address selecting means, said instruction-modifying signal storage means including a second stored signal modifying device having a second modifier signal input for altering an instruction modifying signal held in the address location of such storage means made available by said address selection means by combining the selected stored instruction-modifying signal with an altering signal applied to said second modifier signal input and circuit means connecting said signal output of said instruction-modifying signal storage means to said first modifier signal input of said first stored signal modifying means whereby any instruction-modifying signal may itself be altered before application as a modifying medium in said control unit.

8. An electronic digital computing machine comprising a main data store having a plurality of unique address locations each capable of holding a single number signal or instruction signal, an accumulator, signal transfer channels including signal-controlled switching means between said main store and said accumulator and a control unit providing machine-operation control signals including switch-controlling signals for controlling said signal-controlled switching means under the control of a currently effective instruction signal fed thereto, said control unit including an instruction signal storage device for retaining the currently effective instruction signal therein, said instruction signal storage device including a first stored signal modifying means having a first modifier signal input for modifying the currently effective instruction signal while stored in said storage device in accordance with the form of an instruction-modifying signal applied to said first modifier signal input, a separate instruction-modifying signal storage means having a signal output and including a second stored-signal modifying means comprising an arithmetic unit having a second modifier signal input for altering an instruction-modifying signal held in such storage means by the combination thereof with an altering signal applied to said second modifier signal input, first circuit means connecting said signal output of said instruction-modifying signal storage means to said first modifier signal input of said first stored signal modifying means whereby any instruction-modifying signal may itself be altered before application as a modifying medium in said control unit, and further circuit means including signal-controlled switching means between said signal output of said instruction modifying signal storage means and said main data store for returning any instruction-modifying signal to said main data store for storage therein.

9. An electronic digital computing machine comprising a main data store having a plurality of unique address locations each capable of holding a single number signal or instruction signal, an accumulator, signal transfer channels including signal-controlled switching means between said main store and said accumulator and a control unit providing machine-operation control signals including switch-controlling signals for controlling said signal-controlled switching means under the control of a currently effective instruction signal fed thereto, said control unit including an instruction signal storage device for retaining the currently effective instruction signal therein, said instruction signal storage device including a first stored signal modifying means having a first modifier signal input for modifying the currently effective instruction signal while stored in said storage device in accordance with the form of an instruction-modifying signal applied to said first modifier signal input, a separate instruction-modifying signal storage means having a signal output and including a second stored signal modifying means having a second modifier signal input for altering an instruction-modifying signal held in such storage means in accordance with the form of an altering signal applied to said second modifier signal input, first circuit means connecting said signal output of said instruction-modifying signal storage means to said first modifier signal input of said first stored signal modifying means whereby any instruction-modifying signal may itself be altered before application as a modifying medium in said control unit, signal testing means connected to said signal output of said instruction-modifying signal storage means for testing the form of a stored instruction-modifying signal, said testing means having a test-result signal output providing an output signal indicative of the result of the applied test and further circuit means interconnecting said test-result signal output of said testing means with said control unit for modifying the operation of the latter in accordance with the result of said test.

10. An electronic digital computing machine comprising a main data store having a plurality of unique address locations each capable of holding a single number signal or instruction signal, an accumulator, signal transfer channels including signal-controlled switching means between said main store and said accumulator and a control unit providing machine-operation control signals including switch-controlling signals for controlling said signal-controlled switching means and an instruction-modification control signal under the control of a currently effective instruction signal fed to said control unit from said main store, said control unit including an instruction-signal storage device for retaining the currently effective instruction signal therein, said instruction signal storage device including a first stored signal modifying device having a first modifier signal input for modifying the currently effective instruction signal while stored in said storage device in accordance with the form of an instruction-modifying signal applied to said first modifier signal input, a separate instruction-modifying signal storage means having a plurality of unique address locations each capable of storing a single instruction-modifying signal, a signal output and address selecting means controlled by an applied signal for making the contents of any chosen one of said unique address locations available at said signal output, signal-applying means for applying said instruction-modification control signal to said address selecting means, said instruction-modifying signal storage means including a second signal-modifying device having a second modifier signal input for altering an instruction-modifying signal held in the address location of such storage means made available by said address selecting means in accordance with the form of an altering signal applied to said second modifier signal input, circuit means connecting said signal output of said instruction-modifying signal storage means to said first modifier signal input of said first stored signal modifying means whereby any instruction-modifying signal may itself be altered before application as a modifying medium in said control unit, signal holding means included in said signal applying means for retaining the address selection setting of said address selecting means after decay of the applied instruction modification control signal and means for re-modifying the currently effective instruction held in said instruction signal storage device in accordance with a modified instruction-modification control signal resulting from the first alteration.

11. In an electronic binary digital computing machine comprising a control system for controlling the operation of the machine during each individual operation cycle in accordance with the form of an instruction word currently applied thereto, the provision in said control system of instruction word storage means for receiving and registering such currently effective instruction word during the operation cycle in which it is to be operative, said instruction word storage means including first signal altering means having a modifier signal input for altering the form of said supplied and registered instruction word by combination thereof with an instruction-modifying signal supplied to said modifier signal input of said signal altering means, a separate instruction-modifying signal storage device for registering at least one instruction-modifying signal, said instruction-modifying signal storage device having a signal output and including second signal altering means having a second modifier signal input for altering the form of said instruction-modifying signal held in said instruction-modifying signal storage device in accordance with the form of an altering signal applied to said second modifier signal input and circuit means connecting said signal output of said instruction-modifying storage device to said modifier signal input of said first signal altering means and further circuit means connecting said second modifier signal input to a source of altering signals.

12. In an electronic binary digital computing machine comprising a control system for controlling the operation of the machine during each individual operation cycle in accordance with the form of an instruction word currently applied thereto, the provision in said control system of instruction word storage means for receiving and registering such currently effective instruction word during the operation cycle in which it is to be operative, said instruction word storage means including signal altering means having a modifier signal input for altering the form of said supplied and registered instruction word by combination thereof with an instruction-modifying signal supplied to said modifier signal input of said signal altering means, a separate instruction-modifying signal storage device for registering at least one instruction-modifying signal, said instruction-modifying signal storage device having a signal output and including an arithmetic unit having a second modifier signal input for altering the form of said instruction-modifying signal held in said instruction-modifying signal storage device by combining the stored instruction-modifying signal with an altering signal applied to said second modifier signal input and circuit means connecting said signal output of said instruction-modifying storage device to said modifier signal input of said signal altering means and further circuit means connecting said second modifier signal input to a source of altering signals.

13. In an electronic binary digital computing machine comprising a control system for controlling the operation of the machine during each individual operation cycle in accordance with the form of an instruction word currently applied thereto, the provision in said control system of instruction word storage means for receiving and registering such currently effective instruction word during the operation cycle in which it is to be operative, said instruction word storage means including first signal altering means having a modifier signal input for altering the form of said supplied and registered instruction word by combination thereof with an instruction-modifying signal supplied to said modifier signal input of said signal altering means, a separate instruction-modifying signal storage device for registering at least one instruction-modifying signal, said instruction-modifying signal storage device having a signal output and including a subtractor device having a second modifier signal input for altering the form of said instruction-modifying signal held in said instruction-modifying signal storage device by subtracting a binary number value represented by an altering signal applied to said second modifier signal input from the binary number value represented by said stored instruction-modifying signal and circuit means connecting said signal output of said instruction-modifying storage device to said modifier signal input of said signal altering means and further circuit means connecting said second modifier signal input to a source of altering signals.

14. In an electronic binary digital computing machine comprising a control system for controlling the operation of the machine during each individual operation cycle in accordance with the form of an instruction word currently applied thereto, the provision in said control system of instruction word storage means for receiving and registering such currently effective instruction word during the operation cycle in which it is to be operative, said instruction word storage means including first signal altering means having a modifier signal input for altering the form of said supplied and registered instruction word by combination thereof with an instruction-modifying signal supplied to said modifier signal input of said signal altering means, a separate instruction-modifying signal storage device for registering at least one instruction-modifying signal, said instruction-modifying signal storage device having a signal output and being of a type having a regeneration loop circuit including an arithmetic circuit having a second modifier signal input for altering the form of said instruction-modifying signal held in said instruction-modifying signal storage device by combining the stored instruction-modifying signal with an altering signal applied to said second modifier signal input and circuit means connecting said signal output of said instruction-modifying storage device to said modifier signal input of said signal altering means and further circuit means connecting said second modifier signal input to a source of altering signals.

15. In an electronic binary digital computing machine comprising a control system for controlling the operation of the machine during each individual operation cycle in accordance with the form of an instruction word currently applied thereto, the provision in said control system of instruction word storage means for receiving and registering such currently effective instruction word during the operation cycle in which it is to be operative, said instruction word storage means being of a type having a regeneration loop circuit including a first arithmetic circuit having a modifier signal input for altering the form of said supplied and registered instruction word by combination thereof with an instruction-modifying signal supplied to said modifier signal input of said signal altering means, a separate instruction-modifying signal storage device for registering at least one instruction-modifying signal, said instruction-modifying signal storage device having a signal output and being also of a type having a regeneration loop circuit including a second arithmetic circuit having a second modifier signal input for altering the form of said instruction-modifying signal held in said instruction-modifying signal storage device by combination thereof with an altering signal applied to said second modifier signal input and circuit means connecting said signal output of said instruction-modifying storage device to said modifier signal input of said first arithmetic circuit and further circuit means connecting said second modifier signal input to a source of altering signals.

16. An electronic digital computing machine comprising a main data store having a plurality of unique address locations each capable of holding a single number signal or instruction signal, an accumulator, signal transfer channels including signal controlled switching means between said main store and said accumulator, a control unit providing machine-operation control signals including switch-controlling signals for controlling said signal controlled switching means under the control of an instruction signal fed thereto, said control unit including an instruction signal storage device for retaining the current instruction signal therein and means interconnected with said storage device for modifying the current instruction signal while stored therein in accordance with the form of an applied instruction-modifying signal, a separate instruction-modifying signal storage device of a type having a regenerative loop which includes an interconnected arithmetic unit for altering an instruction-modifying signal held in such storage means by combining the stored instruction-modifying signal with an applied altering signal and circuit means connecting said instruction-modifying signal storage means to said modifying means of said instruction signal storage device of said control unit whereby any instruction-modifying signal may itself be altered before application as a modifying medium in said control unit.

17. An electronic digital computing machine comprising a main data store having a plurality of unique address locations each capable of holding a single number signal or instruction signal, an accumulator, signal transfer channels including signal controlled switching means between said main store and said accumulator, a control unit providing machine-operation control signals including switch-controlling signals for controlling said signal controlled switching means under the control of an instruction signal fed thereto, said control unit including an instruction signal storage device for retaining the current instruction signal therein and means interconnected with said storage device for modifying the current instruction signal while stored therein in accordance with the form of an applied instruction-modifying signal, a separate instruction-modifying signal storage device of a type having a regenerative loop which includes an interconnected number subtracting circuit for altering an instruction-modifying signal held in such storage means by subtracting the number signalled by an applied altering signal from the number signalled by said instruction-modifying signal and circuit means connecting said instruction-modifying signal storage means to said modifying means of said instruction signal storage device of said control unit whereby any instruction-modifying signal may itself be altered before application as a modifying medium in said control unit.

References Cited in the file of this patent

UNITED STATES PATENTS

| | | |
|---|---|---|
| 2,502,360 | Williams | Mar. 28, 1950 |
| 2,575,331 | Compton | Nov. 20, 1951 |
| 2,604,262 | Phelps | July 22, 1952 |

OTHER REFERENCES

Interim Progress Report on the Physical Realization of an Electronic Computing Instrument by Institute for Advanced Study, January 1, 1947 (pages 6 to 11, inclusive), Princeton, New Jersey.

Description of Serial Acoustic Binary EDVAC Lecture 47, "Theory & Techniques of Design of Electronic digital Computers" by Sharpless, Univ. of Pa., June 30, 1948, pages 47–1 to 47–8, 47–13, 47–15 and 47–16, total of 11 pages.

Proc. of the IRE: "A Digital Computer for Scientific Applications" by West, December 1948 (pages 1452 to 1460, inclusive).

Proc. of the Inst. of Elec. Engrs.: Part III, March 1949, "A Storage System for Use with Binary-Digital Computing Machines" by Williams et al. (pages 81 to 100, inclusive).

"A Functional Description of the EDVAC," Univ. of Pa., Moore School of Engineering, November 1, 1949. Volume I, pp. 2–5 to 2–11; volume II—Dwg. 104–2LD–7, Dwg. 104–10LB–1 (note particularly page 2–9, item 2.3.6).

Nature Magazine, "The University of Manchester Universal High Speed Digital Computing Machine," by Kilburn, October 22, 1949; pages 684 to 687.

Proc. of the Inst. of Elec. Engrs., Part II, February 1951, volume 98, No. 61 (pages 13 to 34, inclusive).

"Digital Computers: A Small-Scale Experimental Machine" by Williams et al.